US012793608B2

(12) United States Patent
Park et al.

(10) Patent No.: US 12,793,608 B2
(45) Date of Patent: Nov. 10, 2026

(54) DISPLAY PANEL AND DISPLAY DEVICE HAVING THE SAME

(71) Applicant: Samsung Display Co., LTD., Yongin-si (KR)

(72) Inventors: Do Yeong Park, Yongin-si (KR); Kwi Hyun Kim, Yongin-si (KR); Yeon Kyung Kim, Yongin-si (KR); Sung Chul Hong, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/799,142

(22) Filed: Aug. 9, 2024

(65) Prior Publication Data

US 2025/0246122 A1 Jul. 31, 2025

(30) Foreign Application Priority Data

Jan. 30, 2024 (KR) ........................ 10-2024-0014132

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01)

(58) Field of Classification Search
CPC ............................... G09G 3/32; G09G 3/3233
See application file for complete search history.

(56) References Cited

U.S. PATENT DOCUMENTS

| | | | | |
|---|---|---|---|---|
| 11,778,876 | B2 | 10/2023 | Luo | |
| 2021/0312856 | A1* | 10/2021 | Jeong | G09G 3/32 |
| 2023/0238497 | A1 | 7/2023 | Lee et al. | |
| 2023/0284490 | A1 | 9/2023 | Cheon | |
| 2023/0345783 | A1 | 10/2023 | Li et al. | |
| 2024/0169919 | A1* | 5/2024 | Son | G09G 3/3233 |

FOREIGN PATENT DOCUMENTS

| | | |
|---|---|---|
| CN | 112562573 | 3/2021 |
| CN | 116709815 | 9/2023 |
| KR | 10-2016-0061474 | 6/2016 |
| KR | 10-2039838 | 11/2019 |
| KR | 10-2021-0023392 | 3/2021 |
| KR | 10-2021-0079586 | 6/2021 |
| KR | 10-2023-0115388 | 8/2023 |
| KR | 10-2023-0131370 | 9/2023 |
| WO | 2022/204816 | 10/2022 |

OTHER PUBLICATIONS

International Search Report dated Dec. 2, 2024, in International Application No. PCT/KR2024/012848.

* cited by examiner

*Primary Examiner* — Abdul-Samad A Adediran
(74) *Attorney, Agent, or Firm* — CANTOR COLBURN LLP

(57) ABSTRACT

A display device includes a substrate, sub-pixels disposed on the substrate, a first shared line which is disposed in a boundary area between the sub-pixels and provides a first voltage to the sub-pixels adjacent to the boundary area, and a second shared line which is disposed in the boundary area and provides a second voltage different from the first voltage to the sub-pixels adjacent to the boundary area.

19 Claims, 14 Drawing Sheets

DISPLAY PANEL AND DISPLAY DEVICE HAVING THE SAME

CROSS-REFERENCE TO RELATED APPLICATION(S)

The application claims priority to and benefits of Korean patent application No. 10-2024-0014132 under 35 U.S.C. § 119, filed on Jan. 30, 2024, in the Korean Intellectual Property Office, the entire contents of which are incorporated herein by reference.

BACKGROUND

1. Technical Field

Embodiments relate to a display panel and a display device having the display panel.

2. Description of the Related Art

With the development of information technologies, the importance of a display device which is a connection medium between a user and information increases. Accordingly, display devices such as a liquid crystal display device, an organic light emitting display device, and an inorganic light emitting display device are increasingly used.

Recently, studies on micro LEDs which have a high response speed and a high luminance as compared with the existing LEDs have been actively conducted. In the case of inorganic light emitting elements such as micro LEDs, in case that a Pulse Amplitude Modulation (PAM) pixel driving method is used like organic LEDs, it may be difficult to accurately implement a desired luminance as the peak wavelength of current is moved according to a current density. Therefore, in the case of micro LEDs, a Pulse Width Modulation (PWM) pixel driving method may be used, in which a luminance is expressed by controlling the time for which a current flows through a light emitting element.

SUMMARY

Embodiments provide a display device in which sub-pixels share a line.

Embodiments also provide a display panel in which sub-pixels share a line.

However, embodiments are not limited to those set forth herein. The above and other embodiments will become more apparent to one of ordinary skill in the art to which the disclosure pertains by referencing the detailed description of the disclosure given below.

In accordance with an aspect of the disclosure, there is provided a display device including: a substrate; sub-pixels disposed on the substrate; a first shared line disposed in a boundary area between the sub-pixels, the first shared line that provides a first voltage to the sub-pixels adjacent to the boundary area; and a second shared line disposed in the boundary area, the second shared line that provides a second voltage different from the first voltage to the sub-pixels adjacent to the boundary area.

At least one of the first voltage and the second voltage may be commonly provided to the sub-pixels.

Each of the sub-pixels may include: a light emitting element; a first sub-pixel circuit that controls an emission time of the light emitting element; and a second sub-pixel circuit that provides a driving current to the light emitting element.

The first sub-pixel circuit may include: a first transistor including a control electrode connected to a first node, a first electrode connected to a second node, and a second electrode connected to a third node; a first capacitor including a first electrode that receives a sweep voltage and a second electrode connected to the first node; a second transistor including a control electrode that receives a first writing gate signal, a first electrode that receives a data voltage, and a second electrode connected to the second node; a third transistor including a control electrode that receives the first writing gate signal, a first electrode connected to the third node, and a second electrode connected to the first node; a fourth transistor including a control electrode that receives an emission signal, a first electrode that receives a (1-1)th power voltage, and a second electrode connected to the second node; a fifth transistor including a control electrode that receives the emission signal, a first electrode connected to the third node, and a second electrode connected to the second sub-pixel circuit; and a sixth transistor including a control electrode that receives a first initialization gate signal, a first electrode that receives a first initialization voltage, and a second electrode connected to the first node.

At least one of the first voltage and the second voltage may be one of the sweep voltage, the emission signal, the first initialization gate signal, the (1-1)th power voltage, and the first initialization voltage.

The second sub-pixel circuit may include: a seventh transistor including a control electrode connected to a fourth node connected to the first sub-pixel circuit, a first electrode connected to a fifth node, and a second electrode connected to a sixth node; a second capacitor including a first electrode that receives a (1-2)th power voltage and a second electrode connected to the fourth node; an eighth transistor including a control electrode that receives a second writing gate signal, a first electrode that receives a data voltage, and a second electrode connected to the fifth node; a ninth transistor including a control electrode that receives the second writing gate signal, a first electrode connected to the sixth node, and a second electrode connected to the fourth node; a tenth transistor including a control electrode that receives an emission signal, a first electrode that receives the (1-2)th power voltage, and a second electrode connected to the fifth node; an eleventh transistor including a control electrode that receives the emission signal, a first electrode connected to the sixth node, and a second electrode connected to the light emitting element; a twelfth transistor including a control electrode that receives a second initialization gate signal, a first electrode that receives a first initialization voltage, and a second electrode connected to the fourth node; and a thirteenth transistor including a control electrode that receives a bias gate signal, a first electrode that receives a second initialization voltage, and a second electrode connected to the light emitting element.

At least one of the first voltage and the second voltage may be one of the second writing gate signal, the emission signal, the bias gate signal, the second initialization gate signal, the (1-2)th power voltage, the first initialization voltage, and the second initialization voltage.

The light emitting element may include a first electrode connected to the second sub-pixel circuit and a second electrode that receives a second power voltage. One of the first voltage and the second voltage may be the second power voltage.

The first shared line and the second shared line may be formed as a same conductive layer. The same conductive layer may include: a first conductive pattern forming the first shared line, the first conductive pattern extending in a first direction; and a second conductive pattern forming the second shared line, the second conductive pattern extending in the first direction. A contact hole connected to the first conductive pattern and a contact hole connected to the second conductive pattern may be arranged in the first direction.

The first conductive pattern may include an extension portion extending in the first direction and a connection portion protruding in a second direction intersecting the first direction to be connected to the contact hole connected to the first conductive pattern. The second conductive pattern may include an extension portion extending in the first direction and a connection portion protruding in the opposite direction of the second direction intersecting the first direction to be connected to the contact hole connected to the second conductive pattern.

The display device may further include a third shared line disposed in the boundary area, the third shared line that provides a third voltage different from the first voltage and the second voltage to the sub-pixels adjacent to the boundary area.

The first shared line, the second shared line, and the third shared line may be formed as a same conductive layer. The conductive layer may include: a first conductive pattern forming the first shared line, the first conductive pattern extending in a first direction; a second conductive pattern forming the second shared line, the second conductive pattern extending in the first direction; and a third conductive pattern forming the third shared line, the third conductive pattern extending in the first direction. A contact hole connected to the first conductive pattern, a contact hole connected to the second conductive pattern, and a contact hole connected to the third conductive pattern may be arranged in the first direction.

The first conductive pattern may include an extension portion extending in the first direction and a connection portion protruding in a direction intersecting the first direction to be connected to the contact hole connected to the first conductive pattern. The second conductive pattern may include an extension portion extending in the first direction and a connection portion protruding in the opposite direction of the second direction intersecting the first direction to be connected to the contact hole connected to the second conductive pattern. The third conductive pattern may include a connection portion connected to the contact hole connected to the third conductive pattern, a first extension portion which is connected to the connection portion in the second direction intersecting the first direction and extends in the first direction, and a second extension portion which is connected to the connection portion in the opposite direction of the second direction intersecting the first direction and extends in the first direction.

The boundary area may include a first boundary area and a second boundary area. The first shared line may be disposed in the first boundary area, and provide the first voltage to the sub-pixels adjacent to the first boundary area. The second shared line may be disposed in the second boundary area, and provide the second voltage to the sub-pixels adjacent to the first boundary area. The display device may further include: a third shared line disposed in the second boundary area, the third shared line that provides a third voltage different from the first voltage and the second voltage to the sub-pixels adjacent to the second boundary area; and a fourth shared line disposed in the second boundary area, the fourth shared line that provides a fourth voltage different from the first voltage, the second voltage, and the third voltage to the sub-pixels adjacent to the second boundary area.

The first, second, third, and fourth shared lines may extend in a first direction. The first boundary area and the second boundary area may be alternately disposed in a direction intersecting the first direction.

The sub-pixels may have a mirror symmetry with respect to the boundary area.

In accordance with another aspect of the disclosure, there is provided a display panel including: a substrate; sub-pixels disposed on the substrate; a first shared line disposed in a boundary area between the sub-pixels, the first shared line being electrically connected to the sub-pixels adjacent to the boundary area; and a second shared line disposed in the boundary area, the second shared line being spaced apart from the first shared line, the second shared line being electrically connected to the sub-pixels adjacent to the boundary area.

The first shared line and the second shared line may be formed as a same conductive layer. The conductive layer may include: a first conductive pattern forming the first shared line, the first conductive pattern extending in a first direction; and a second conductive pattern forming the second shared line, the second conductive pattern extending the first direction. A contact hole connected to the first conductive pattern and a contact hole connected to the second conductive pattern may be arranged in the first direction.

The first conductive pattern may include an extension portion extending in the first direction and a connection portion protruding in a direction intersecting the first direction to be connected to the contact hole connected to the first conductive pattern. The second conductive pattern may include an extension portion extending in the first direction and a connection portion protruding in the opposite direction of the second direction intersecting the first direction to be connected to the contact hole connected to the second conductive pattern.

The display panel may further include a third shared line disposed in the boundary area, the third shared line being spaced apart from the first and second shared lines, the third shared line being electrically connected to the sub-pixels adjacent to the boundary area.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION OF THE EMBODIMENTS

Figure 1:
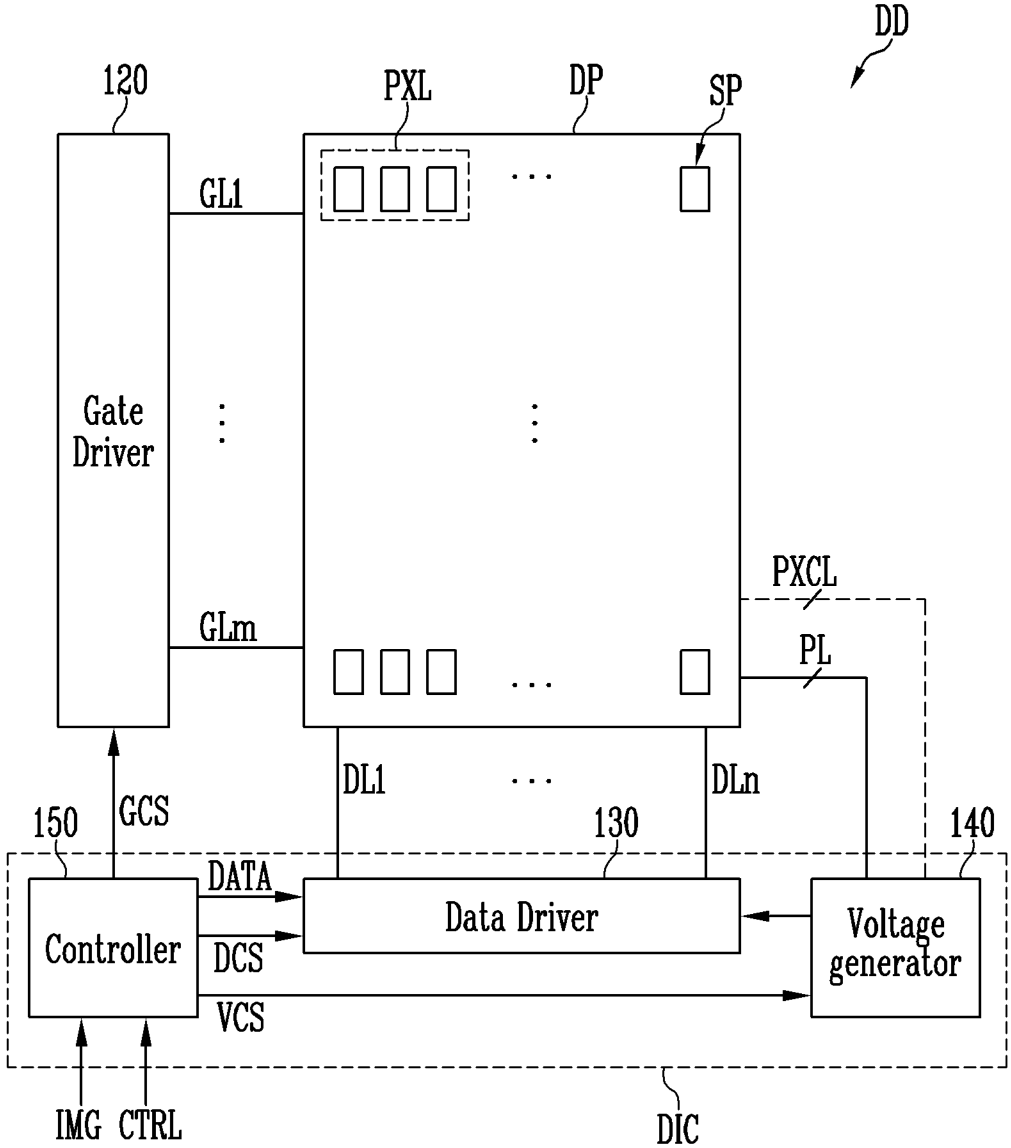
FIG. 1 is a schematic block diagram illustrating an embodiment of a display device.

In the following description, for the purposes of explanation, numerous specific details are set forth in order to provide a thorough understanding of various embodiments or implementations of the invention. As used herein, "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the scope of the invention.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element or a layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the axis of the first direction DR1, the axis of the second direction DR2, and the axis of the third direction DR3 are not limited to three axes of a rectangular coordinate system, such as the X, Y, and Z-axes, and may be interpreted in a broader sense. For example, the axis of the first direction DR1, the axis of the second direction DR2, and the axis of the third direction DR3 may be perpendicular to one another, or may represent different directions that are not perpendicular to one another. For the purposes of this disclosure, "at least one of A and B" may be understood to mean A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the invention. Further, the blocks, units, and/or modules of some embodiments may be physically combined into more complex blocks, units, and/or modules without departing from the scope of the invention.

FIG. 1 is a schematic block diagram illustrating an embodiment of a display device.

Referring to FIG. 1, the display device DD may include a display panel DP, a gate driver 120, a data driver 130, a voltage generator 140, and a controller 150.

The display panel DP may include sub-pixels SP. The sub-pixels SP may be connected to the gate driver 120 through first to m-th gate lines GL1 to GLm. The sub-pixels SP may be connected to the data driver 130 through first to n-th data lines DL1 to DLn.

The sub-pixels SP may generate lights of two or more colors. For example, each of the sub-pixels SP may generate lights of red, green, blue, cyan, magenta, yellow, white, and the like.

Two or more sub-pixels among the sub-pixels SP may constitute (or form) a pixel PXL. For example, the pixel PXL may include three sub-pixels as shown in FIG. 1. As such, the pixel PXL may emit lights of various colors with various luminances according to a combination of lights emitted from the sub-pixels included therein.

The gate driver 120 may be connected to the sub-pixels SP arranged in a row direction through the first to m-th gate lines GL1 to GLm. The gate driver 120 may output gate signals to the first to m-th gate lines GL1 to GLm in response to a gate control signal GCS. In embodiments, the gate control signal GCS may include a start signal indicating a start of each frame, a horizontal synchronization signal, and the like.

The gate driver 120 may be disposed at a side of the display panel DP. However, embodiments are not limited thereto. For example, the gate driver 120 may be divided into two or more drivers which are physically and/or logically divided, and these drivers may be disposed at a side of the display panel DP and the other side of the display panel DP, which is opposite to the side. As such, in some embodiments, the gate driver 120 may be disposed in various forms at the periphery of the display panel DP.

The data driver 130 may be connected to the sub-pixels SP arranged in a column direction through the first to n-th data lines DL1 to DLn. The data driver 130 may receive image data DATA and a data control signal DCS from the controller 150. The data driver 130 may operate in response to the data control signal DCS. In embodiments, the data control signal DCS may include a source start pulse, a source shift clock, a source output enable signal, and the like.

The data driver 130 may receive voltages from the voltage generator 140. The data driver 130 may apply data signals having grayscale voltages corresponding to the image data DATA to the first to n-th data lines DL1 to DLn by using the received voltages. In case that a gate signal is applied to each of the first to m-th gate lines GL1 to GLm, data signals corresponding to the image data DATA may be applied to the first to n-th data line DL1 to DLm. Accordingly, corresponding sub-pixels SP may generate light corresponding to the data signals. Accordingly, an image may be displayed on the display panel DP.

In embodiments, the gate driver 120 and the data driver 130 may include complementary metal-oxide semiconductor (CMOS) circuit elements.

The voltage generator 140 may operate in response to a voltage control signal VCS from the controller 150. The voltage generator 140 may generate voltages and provide the generated voltages to components of the display device DD. The voltage generator 140 may generate voltages by receiving an input voltage from the outside of the display device DD and regulating the received voltage.

The voltage generator 140 may generate a first power voltage (e.g., a (1-1)th power voltage and a (1-2)th power voltage, which will be described layer) and a second power voltage. The generated first and second power voltages may be provided to the sub-pixels SP through power lines PL. In other embodiments, at least one of the first and second power voltages may be provided from the outside of the display device DD.

For example, the voltage generator 140 may provide various voltages and/or signals. For example, the voltage generator 140 may provide one or more initialization voltages (e.g., first and second initialization voltages which will be described later) applied to the sub-pixels SP. For example, in a sensing operation for sensing electrical characteristics of transistors and/or light emitting elements of the sub-pixels SP, a reference voltage may be applied to the first to n-th data lines DL1 to DLn, and the voltage generator 140 may generate the reference voltage and transfer the reference voltage to the data driver 130. For example, in a display operation for displaying an image on the display panel DP, common pixel control signals may be applied to the sub-pixels SP, and the voltage generator 140 may generate the pixel control signals. In embodiments, the voltage generator 140 may provide the pixel control signals to the sub-pixels SP through pixel control lines PXCL. In FIG. 1, it is illustrated that the pixel control lines PXCL are connected between the voltage generator 140 and the display panel DP. However, embodiments are not limited thereto. For example, the pixel control lines PXCL may be connected between the gate driver 120 and the display panel DP. The pixel control signals may be transferred to the pixel control lines PXCL from the voltage generator 140 through the gate driver 120.

The controller 150 may control overall operations of the display device DD. The controller 150 may receive, from the outside, image data IMG and a control signal CTRL corresponding to the image data IMG. The controller 150 may provide the gate control signal GCS, the data control signal DCS, and the voltage control signal VCS in response to the control signal CTRL.

The controller 150 may convert the image data IMG to be suitable for the display device DD or the display panel DP, thereby outputting the image data DATA. In embodiments, the controller 150 may align the image data IMG to be suitable for the sub-pixels SP in units of rows, thereby outputting the image data DATA.

Two or more components among the data driver 130, the voltage generator 140, and the controller 150 may be mounted on an integrated circuit (e.g., single integrated circuit). As shown in FIG. 1, the data driver 130, the voltage generator 140, and the controller 150 may be included in a driver integrated circuit DIC. The data driver 130, the voltage generator 140, and the controller 150 may be components functionally divided in a driver integrated circuit (or single driver integrated circuit) DIC. In other embodiments, at least one of the data driver 130, the voltage generator 140, and the controller 150 may be provided as a component distinguished from the driver integrated circuit DIC.

Figure 2:
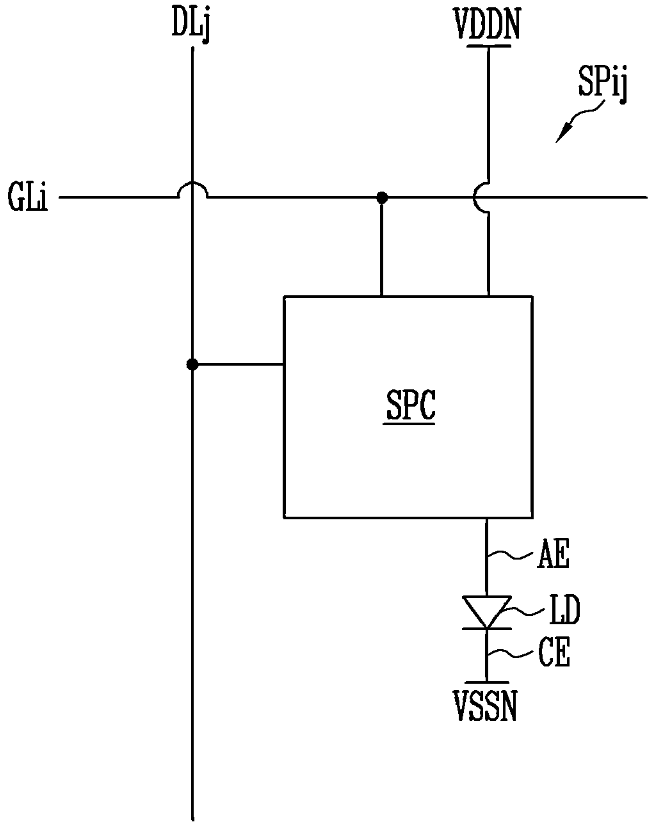
FIG. 2 is a schematic block diagram illustrating an embodiment of any one of sub-pixels shown in FIG. 1.

FIG. 2 is a schematic block diagram illustrating an embodiment of any one of the sub-pixels shown in FIG. 1. In FIG. 2, a sub-pixel SPij arranged on an i-th row (i is an integer which is greater than or equal to 1 and is smaller than or equal to m) and a j-th column (j is an integer which is greater than or equal to 1 and is smaller than or equal to n) among the sub-pixels SP shown in FIG. 1 is illustrated.

Referring to FIG. 2, the sub-pixel SPij may include a sub-pixel circuit SPC and a light emitting element LD.

The light emitting element LD may be connected between a first power voltage node VDDN and a second power voltage node VSSN. The first power voltage node VDDN may be connected to one of the power lines PL shown in FIG. 1, to receive a first power voltage. The second power voltage node VSSN may be connected to another of the power lines PL, to receive a second power voltage. The first power voltage may have a voltage level higher than a voltage level of the second power voltage.

The light emitting element LD may be connected between an anode electrode AE and a cathode electrode CE. The anode electrode AE may be connected to the first power voltage node VDDN through the sub-pixel circuit SPC. For example, the anode electrode AE may be connected to the first power voltage node VDDN through one or more transistors included in the sub-pixel circuit SPC. The cathode electrode CE may be connected to the second power voltage node VSSN. The light emitting element LD may emit light according to a current flowing from the anode electrode AE to the cathode electrode CE.

The sub-pixel circuit SPC may be connected to an i-th gate line GLi among the first to m-th gate lines GL1 to GLm shown in FIG. 1 and a j-th data line DLj among the first to n-th data lines DL1 to DLn shown in FIG. 1. In response to a gate signal received through the i-th gate line GLi, the sub-pixel circuit SPC may control the light emitting element LD to emit light according to a data signal received through the j-th data line DLj. In embodiments, the sub-pixel circuit SPC may be further connected to the pixel control lines PXCL shown in FIG. 1. The sub-pixel circuit SPC may control the light emitting element LD in further response to control signals received through the pixel control lines PXCL.

For these operations, the sub-pixel circuit SPC may include circuit elements, e.g., transistors and one or more capacitors.

The transistors of the sub-pixel circuit SPC may include P-type transistors and/or N-type transistors. In embodiments, the transistors of the sub-pixel circuit SPC may include a Metal Oxide Silicon Field Effect Transistor (MOSFET). In embodiments, the transistors of the sub-pixel circuit SPC may include an amorphous silicon semiconductor, a monocrystalline silicon semiconductor, polycrystalline silicon semiconductor, an oxide semiconductor, and the like.

Figure 3:
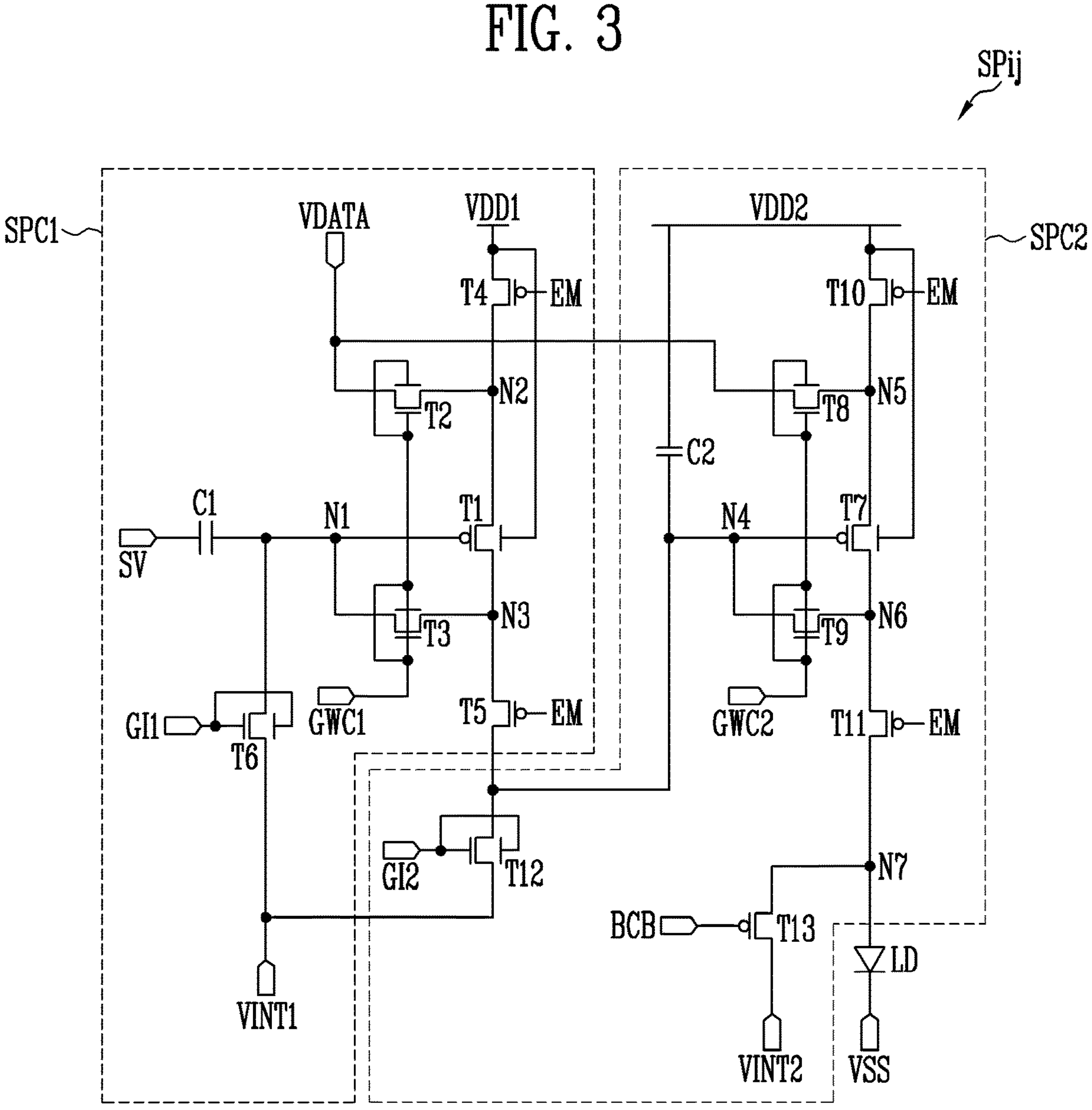
FIG. 3 is a schematic diagram of an equivalent circuit of an example of the sub-pixel shown in FIG. 2.

FIG. 3 is a schematic diagram of an equivalent circuit of an example of the sub-pixel shown in FIG. 2.

Referring to FIG. 3, the sub-pixel SPij may include a light emitting element LD, a first sub-pixel circuit SPC1 which controls an emission time of the light emitting element LD, and a second sub-pixel circuit SPC2 which provides a driving current to the light emitting element LD.

For example, the first sub-pixel circuit SPC1 may include a first transistor T1, a first capacitor C1, a second transistor T2, a third transistor T3, a fourth transistor T4, a fifth transistor T5, and a sixth transistor T6. The first transistor T1 may include a control electrode connected to a first node N1, a first electrode connected to a second node N2, and a second electrode connected to a third node N3. The first capacitor C1 may include a first node receiving a sweep voltage SV and a second electrode connected to the first node N1. The second transistor T2 may include a control electrode receiving a first writing gate signal GWC1, a first electrode receiving a data voltage VDATA, and a second electrode connected to the second node N2. The third transistor T3 may include a control electrode the first writing gate signal GWC1, a first electrode connected to the third node N3, and a second electrode connected to the first node N1. The fourth transistor T4 may include a control electrode receiving an emission signal EM, a first electrode receiving a (1-1)th power voltage VDD1, and a second electrode connected to the second node N2. The fifth transistor T5 may include a control electrode receiving the emission signal EM, a first electrode connected to the third node N33, and a second electrode connected to the second sub-pixel circuit SPC2 (e.g., a fourth node N4). The sixth transistor T6 may include a control electrode receiving a first initialization gate signal GI1, a first electrode receiving a first initialization voltage VINT1, and a second electrode connected to the first node N1.

For example, the second sub-pixel circuit SPC2 may include a seventh transistor T7, a second capacitor C2, an eighth transistor T8, a ninth transistor T9, a tenth transistor T10, an eleventh transistor T11, a twelfth transistor T12, and a thirteenth transistor T13. The seventh transistor T7 may include a control electrode connected to the fourth node N4, a first electrode connected to a fifth node N5, and a second electrode connected to a sixth node N6. The second capacitor C2 may include a first electrode receiving a (1-2)th power voltage VDD2 and a second electrode connected to the fourth node N4. The eighth transistor T8 may include a control electrode receiving a second writing gate signal GWC2, a first electrode receiving the data voltage VDATA, and a second electrode connected to the fifth node N5. The ninth transistor T9 may include a control electrode receiving the second writing gate signal GWC2, a first electrode connected to the sixth node N6, and a second electrode connected to the fourth node N4. The tenth transistor T10 may include a control electrode receiving the emission signal EM, a first electrode receiving the (1-2)th power voltage VDD2, and a second electrode connected to the fifth node N5. The eleventh transistor T11 may include a control electrode receiving the emission signal EM, a first electrode connected to the sixth node N6, and a second electrode connected to a seventh node N7. The twelfth transistor T12 may include a control electrode receiving a second initialization gate signal GI2, a first electrode receiving the first initialization voltage VINT1, and a second electrode connected to the fourth node N4. The thirteenth transistor T13 may include a control electrode receiving a bias gate signal BCB, a first electrode a second initialization voltage VINT2, and a second electrode connected to the seventh node N7.

For example, the light emitting element LD may include a first electrode (e.g., an anode electrode AE of FIG. 2) connected to the seventh node N7 and a second electrode (e.g., a cathode electrode of FIG. 2) receiving a second power voltage VSS.

The first, fourth, fifth, seventh, tenth, eleventh, and thirteenth transistors T1, T4, T5, T7, T10, T11 , and T13 may be P-type transistors, and the second, third, sixth, eighth, ninth, and twelfth transistors T2, T3, T6, T8, T9, and T12 may be N-type transistors. However, embodiments are not limited thereto. The P-type transistors may be replaced with N-type transistors, and the N-type transistors may be replaced with P-type transistors.

In an embodiment, the first transistor T1 may include a back gate electrode receiving the (1-1)th power voltage VDD1, the second transistor T2 may include a back gate electrode connected to the control electrode of the second transistor T2, the third transistor T3 may include a back gate electrode connected to the control electrode of the third transistor T3, and the sixth transistor T6 may include a back gate electrode receiving the first initialization gate signal GI1.

In an embodiment, the seventh transistor T7 may include a back gate electrode receiving the (1-2)th power voltage VDD2, the eighth transistor T8 may include a back gate electrode connected to the control electrode of the eighth transistor T8, the ninth transistor T9 may include a back gate electrode connected to the control electrode of the ninth transistor T9, and the twelfth transistor T12 may include a back gate electrode receiving the second initialization gate signal GI2.

The sixth transistor T6 may provide the first initialization voltage VINT1 to the first node N1 in response to the first initialization gate signal GI1. Accordingly, a voltage of the first node N1 may be initialized to the first initialization voltage VINT1.

The second transistor T2 may provide the data voltage VDATA to the second node N2 in response to the first writing gate signal GWC1. The third transistor T3 may diode-connect the first transistor T1 in response to the first writing gate signal GWC1. Accordingly, a voltage compensated by a threshold voltage of the first transistor T1 may be provided to the first node N1.

The fourth transistor T4 may provide the first power voltage VDD1 to the first transistor T1 in response to the emission signal EM. The fifth transistor T5 may provide a current generated by the first transistor T1 to the fourth node N4 in response to the emission signal EM. The sweep voltage SV may be decreased, and a time at which the first transistor T1 is turned on may vary according to a magnitude of the data voltage VDATA. Accordingly, a time at which a voltage of the fourth node N4 increases may vary, and a time at which the seventh transistor T7 is turned off may vary. For example, the first sub-pixel circuit SPC1 may adjust the time at which the seventh transistor T7 providing the driving current to the light emitting element LD is turned off, so that the emission time of the light emitting element LD may be controlled. For example, a luminance of the light emitting element LD may vary according to the emission time (e.g., grayscale expression).

In an embodiment, each of the sweep voltage SV, the second writing gate signal GWC2, the emission signal EM, the bias gate signal BCB, the first initialization gate signal GI1, and the second initialization gate signal GI2 may be a pixel control signal. For example, the pixel control signal may be equally (or commonly) provided to the sub-pixels SP (see FIG. 1).

In an embodiment, the first writing gate signal GWC1 may be provided to the sub-pixels SP through the first to m-th gate lines GL1 to GLm (see FIG. 1). For example, the first writing gate signal GWC1 may be sequentially provided the first to m-th gate lines GL1 to GLm (see FIG. 1).

Figure 4:
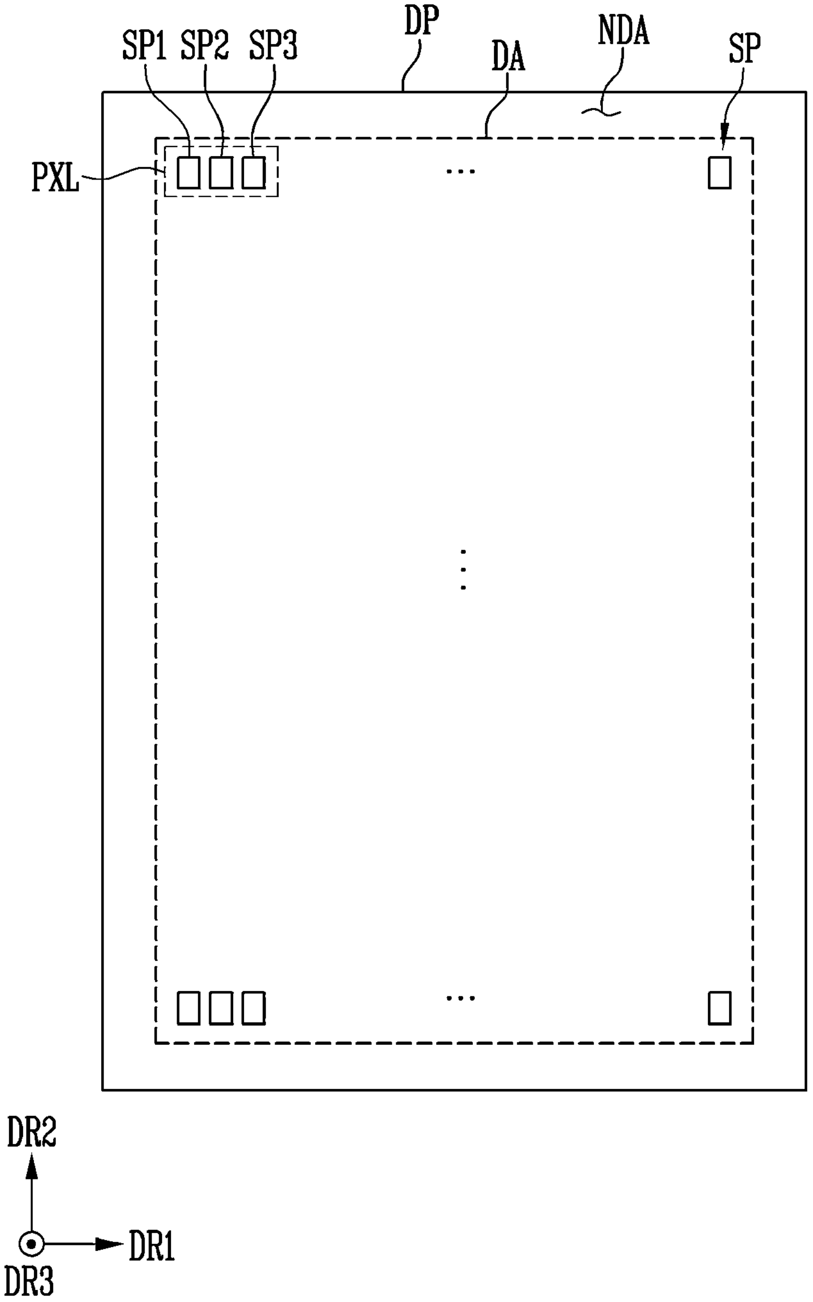
FIG. 4 is a schematic plan view illustrating an embodiment of a display panel shown in FIG. 1.

FIG. 4 is a schematic plan view illustrating an embodiment of the display panel shown in FIG. 1.

Referring to FIG. 4, a display panel DP may include a display area DA and a non-display area NDA. The display panel DP may display an image through the display area DA. The non-display area NDA may be disposed at the periphery of the display area DA.

The display panel DP may include sub-pixels SP in the display area DA. The sub-pixels SP may be arranged in a first direction DR1 and a second direction DR2 intersecting the first direction DR1. For example, the sub-pixels SP may be arranged in a matrix form along the first direction DR1 and the second direction DR2. In another example, the sub-pixels SP may be arranged in a zigzag form along the first direction DR1 and the second direction DR2. The arrangement of the sub-pixels SP may vary in some embodiments. The first direction DR1 may be a row direction, and the second direction DR2 may be a column direction.

Two or more sub-pixels among the sub-pixels SP may constitute (or form) a pixel (or single pixel) PXL. In FIG. 4, it is illustrated that the pixel PXL includes three sub-pixels SP1 to SP3. However, embodiments are not limited thereto. For example, the pixel PXL may include two sub-pixels. Hereinafter, for convenience of description, it is assumed that the pixel PXL includes first to third sub-pixels SP1 to SP3.

Each of the first to third sub-pixels SP1 to SP3 may generate light of one of various colors such as red, green, blue, cyan, magenta, and yellow. Hereinafter, for clear and simple description, it is assumed that the first sub-pixel SP1 generates light of a red color, the second sub-pixel SP2 generates light of a green color, and the third sub-pixel SP3 generates light of a blue color.

Each of the first to third sub-pixels SP1 to SP3 may include at least one light emitting element that generates light. In embodiments, light emitting elements of the first to third sub-pixels SP1 to SP3 may generate light of the same color. For example, the light emitting elements of the first to third sub-pixels SP1 to SP3 may generate light of a blue color. In other embodiments, the light emitting elements of the first to third sub-pixels SP1 to SP3 may generate lights of different colors. For example, the light emitting elements of the first to third sub-pixels SP1 to SP3 may generate lights a red color, a green color, and a blue color, respectively.

Self-luminous display panels, such as a light emitting diode display panel (LED display panel) using a light emitting diode of micro scale or nano scale as a light emitting element and an organic light emitting display panel (OLED panel) using an organic light emitting diode as a light emitting element, may be used as the display panel DP.

A component for controlling the sub-pixels SP may be disposed in the non-display area NDA. Lines connected to the sub-pixels SP, e.g., the first to m-th gate lines GL1 to GLm, the first to n-th data lines DL1 to DLn, the power lines PL, and the pixel control lines PXCL, which are shown in FIG. 1, may be disposed in the non-display area NDA.

At least one of the gate driver 120, the data driver 130, the voltage generator 140, and the controller 150, which are shown in FIG. 1, may be disposed in the non-display area NDA of the display panel DP. In embodiments, the gate driver 120 may be disposed in the non-display area NDA. The data driver 130, the voltage generator 140, and the controller 150 may be implemented into the driver integrated circuit DIC shown in FIG. 1, which is distinguished from the display panel DP, and the driver integrated circuit DIC may be connected to the lines disposed in the non-display area NDA. In other embodiments, the gate driver 120, the data driver 130, the voltage generator 140, and the controller 150 may be implemented into an integrated circuit (or single integrated circuit) distinguished from the display panel DP.

In embodiments, the display area DA may have various shapes. The display area DA may have a closed-loop shape including linear sides and/or curved sides. For example, the display area DA may have shapes such as a polygon, a circle, a semicircle, and an ellipse.

In embodiments, the display panel DP may have a flat display surface. In other embodiments, the display panel DP may at least partially have a round display surface. In embodiments, the display panel DP may be bendable, foldable or rollable. The display panel DP and/or a substrate of the display panel DP may include materials having flexibility.

Figure 5:
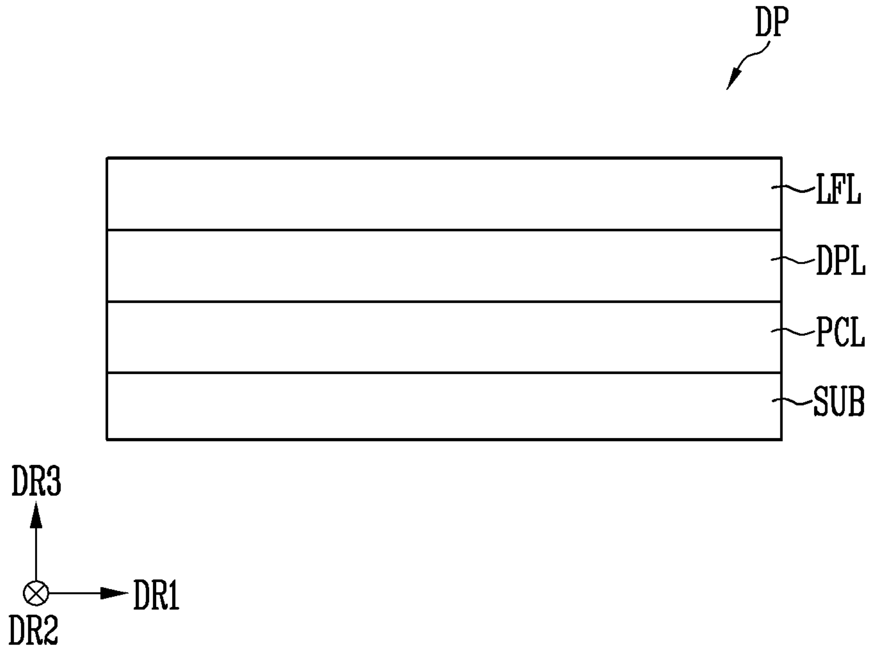
FIG. 5 is a schematic plan view illustrating an embodiment of the display panel shown in FIG. 4.

FIG. 5 is a schematic plan view illustrating an embodiment of the display panel shown in FIG. 4.

Referring to FIG. 5, a display panel DP may include a substrate SUB, and a pixel circuit layer PCL, a display panel layer DPL, and a light functional layer LFL, which are sequentially stacked in a third direction DR3 intersecting the first and second directions DR1 and DR2 on the substrate SUB.

The substrate SUB may be made of an insulative material such as glass or resin. For example, the substrate SUB may include a glass substrate. In another example, the substrate SUB may include polyimide (PI) substrate. In still another example, the substrate SUB may include a silicon wafer substrate formed using a semiconductor process.

In embodiments, the substrate SUB may be made of a material having flexibility to be curvable or foldable, and have a single-layer structure or a multi-layer structure. For example, the material having flexibility may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, embodiments are not limited thereto.

The pixel circuit layer PCL may be disposed on the substrate SUB. The pixel circuit layer PCL may include insulating layers and semiconductor patterns and conductive patterns, which are disposed between the insulating layers. The conductive patterns of the pixel circuit layer PCL may function as circuit elements, lines, and the like.

The circuit elements of the pixel circuit layer PCL may include the sub-pixel circuit SPC (see FIG. 2) of each of the sub-pixels SP shown in FIG. 4. For example, the circuit elements of the pixel circuit layer PCL may be provided as transistors and one or more capacitors of the sub-pixel circuit SPC.

The lines of the pixel circuit layer PCL may include lines connected to each of the sub-pixels SP. The lines of the pixel circuit layer PCL may include various signal lines and/or various voltage lines, which are necessary for driving the display panel layer DPL.

The display panel layer DPL may be disposed on the pixel circuit layer PCL. The display panel layer DPL may include light emitting elements of the sub-pixels SP.

The light functional layer LFL may be disposed on the display panel layer DPL. The light functional layer LFL may include light conversion patterns having color conversion particles and/or light scattering particles. For example, color conversion particles may include quantum dots. The quantum dots may change a wavelength (or color) of light emitted from the display panel layer DPL. The light functional layer LFL may further include light scattering patterns having light scattering particles. In another example, the light conversion patterns and the light scattering patterns may be omitted.

The light functional layer LFL may further include a color filter layer including color filters. The color filter may selectively transmit light having a specific wavelength (or specific color) therethrough. In another example, the color filter layer may be omitted.

A window for protecting an exposed surface (or top surface) of the display panel DP may be provided on the light functional layer LFL. The window may protect the display panel DP from external impact. The window may be bonded to the light functional layer LFL through an optically transparent adhesive (or cohesive) member. The window may have a multi-layer structure selected from a glass substrate, a plastic film, and a plastic substrate. This multi-layer structure may be formed by a continuous process or an adhesive process using an adhesive layer. The whole or a portion of the window may have flexibility.

Figure 6:
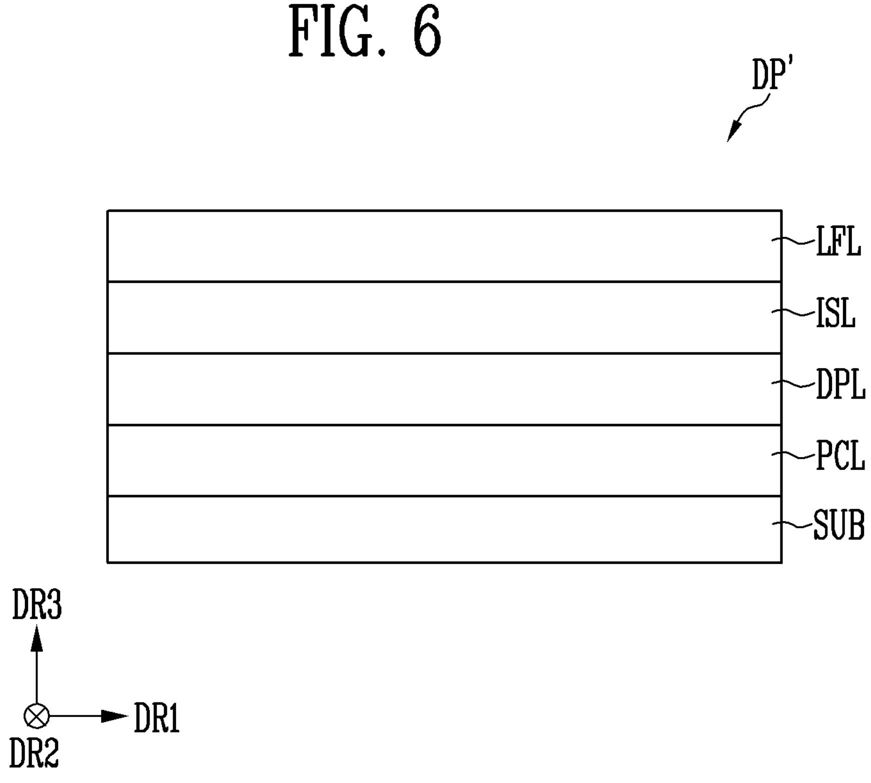
FIG. 6 is a schematic plan view illustrating another embodiment of the display panel shown in FIG. 4.

FIG. 6 is a schematic plan view illustrating another embodiment of the display panel shown in FIG. 4.

Referring to FIG. 6, a display panel DP' may include a substrate SUB, a pixel circuit layer PCL, a display panel layer DPL, an input sensing layer ISL, and a light functional layer LFL. The substrate SUB, the pixel circuit layer PCL, the display panel layer DPL, and the light functional layer LFL are similar or identical to the substrate SUB, the pixel circuit layer PCL, the display panel layer DPL, and the light functional layer LFL, which are described with reference to FIG. 5, respectively. Hereinafter, redundant descriptions will be omitted for descriptive convenience.

The input sensing layer ISL may sense a user input with respect to a top surface (or display surface) of the display panel DP'. The input sensing layer ISL may include components suitable for sensing an external object such as a hand of a user or a pen. For example, the input sensing layer ISL may include touch electrodes.

Figure 7:
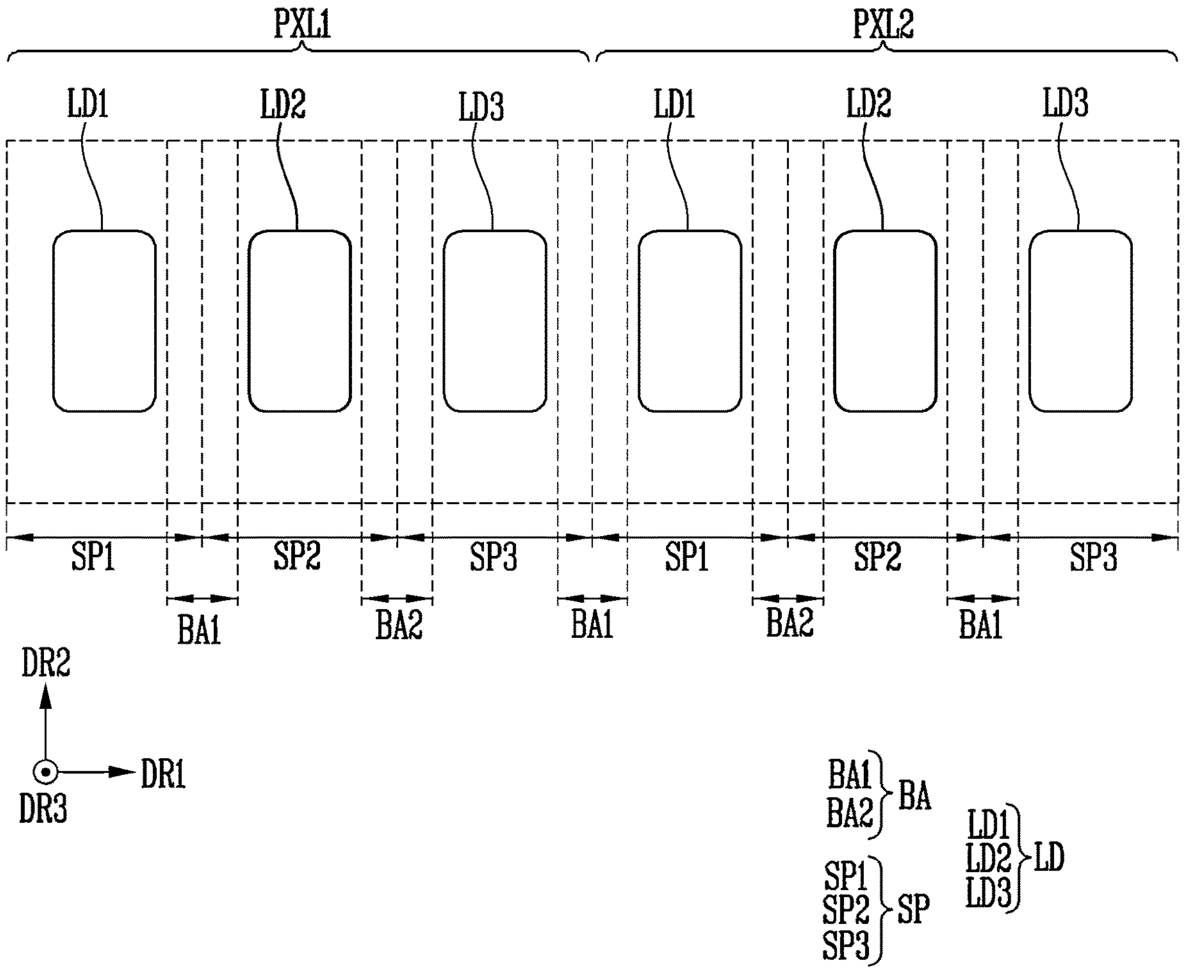
FIG. 7 is a schematic plan view illustrating pixels shown in FIG. 4.

FIG. 7 is a schematic plan view illustrating the pixels shown in FIG. 4.

For convenience of description, FIG. 7 illustrates a first pixel PXL1 and a second pixel PXL2 among the pixels.

Referring to FIG. 7, each of the pixels PXL1 and PXL2 may include first, second, and third sub-pixels SP1, SP2, and SP3. The first to third sub-pixels SP1 to SP3 may be arranged in the first direction DR1. However, the arrangement of the first to third sub-pixels SP1 to SP3 is not limited thereto, and may be various changed in some embodiments. For example, the first to third sub-pixels SP1 to SP3 may be arranged in zigzag.

First, second, and third light emitting elements LD1, LD2, and LD3 may be disposed in the first to third sub-pixels SP1 to SP3, respectively. The first light emitting element LD1, the second light emitting element LD2, and the third light emitting element LD3 may be inorganic light emitting diodes including an inorganic light emitting material. However, embodiments are not limited thereto. For example, organic light emitting diodes may be used.

A shared line which will be described later may be disposed in a boundary area BA between the sub-pixels SP1 to SP3. This will be described in detail later.

Figure 8:
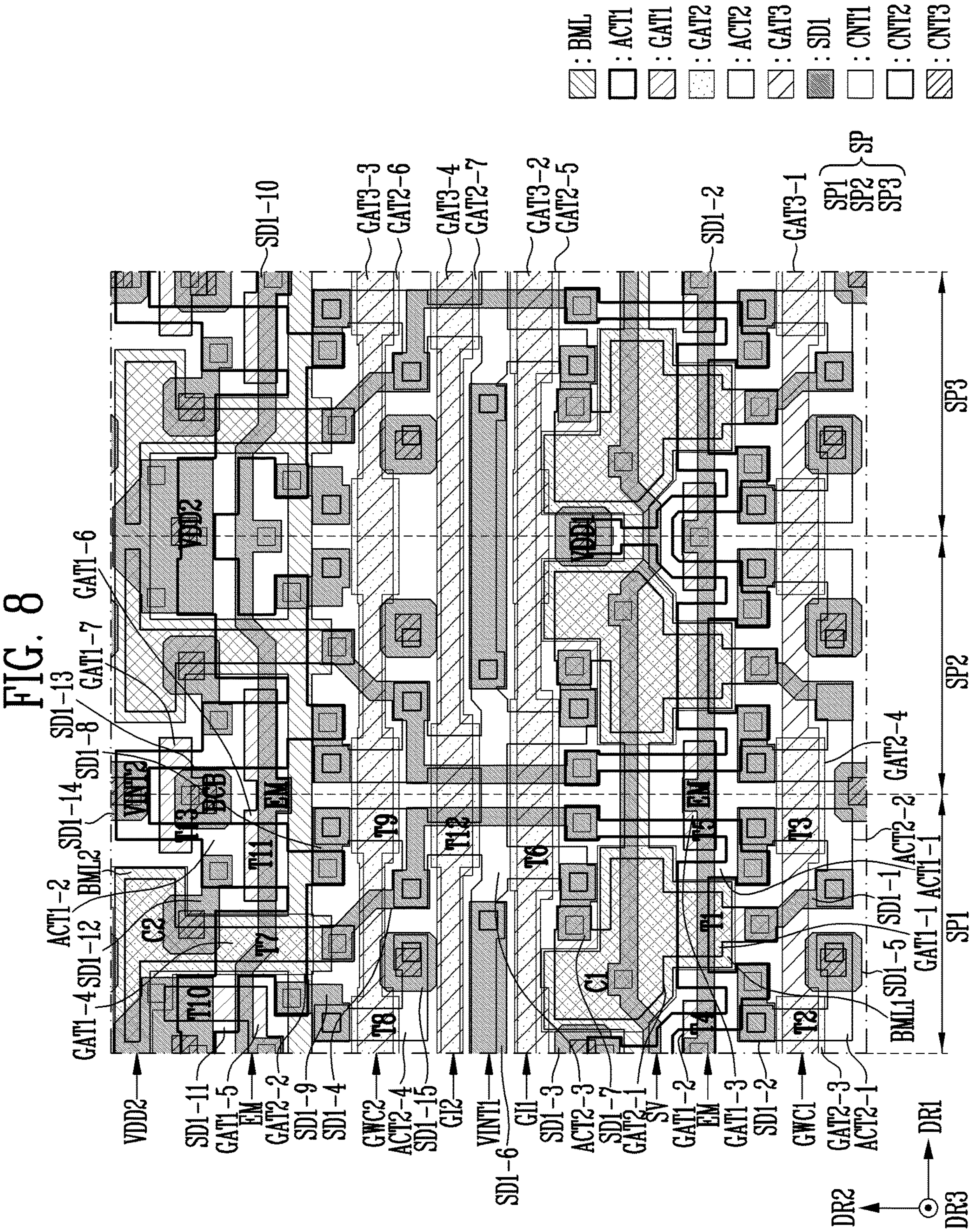
FIGS. 8 and 9 are layout views illustrating an example of a pixel shown in FIG. 4.
Figure 9:
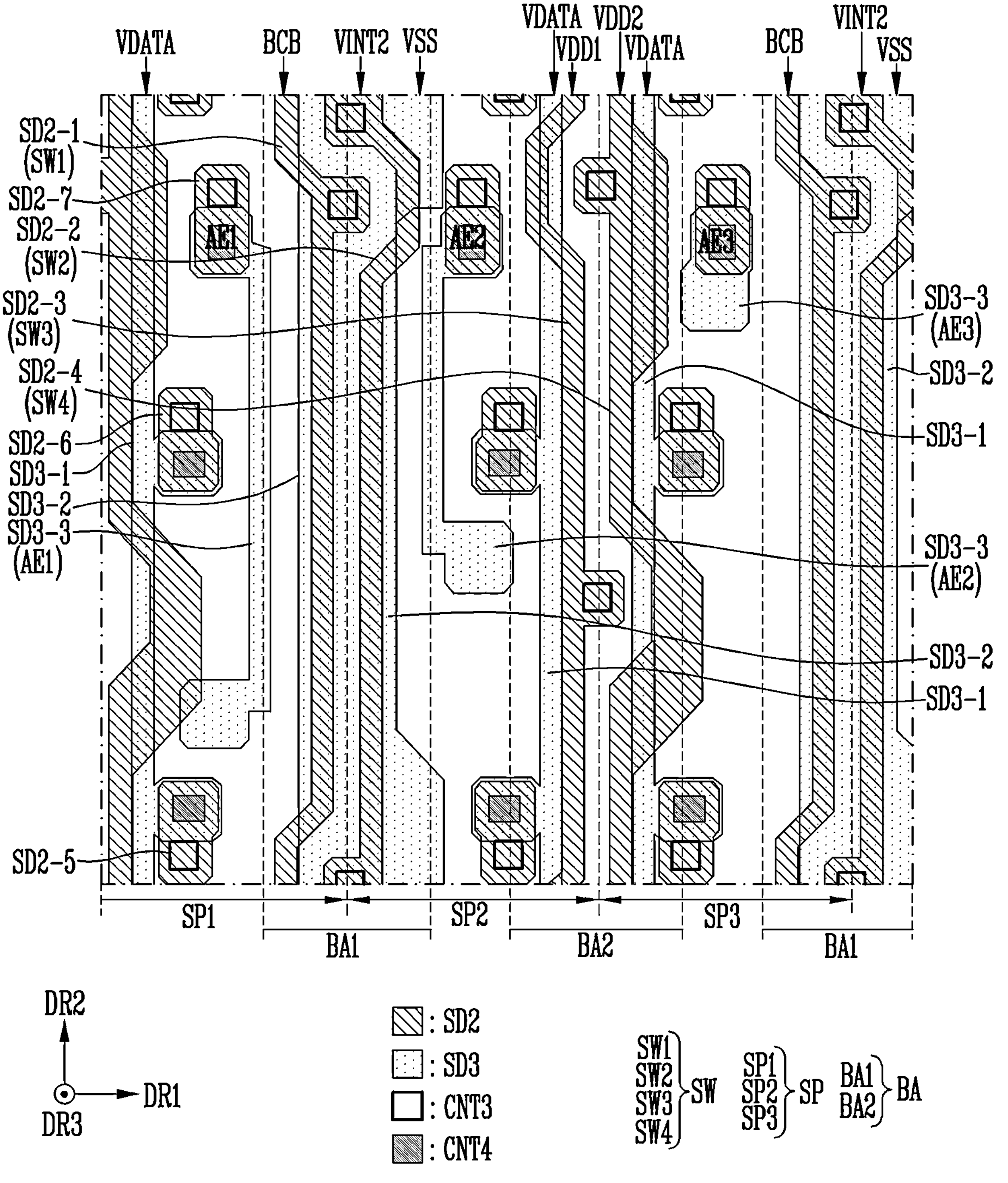

FIGS. 8 and 9 are layout views illustrating an example of the pixel shown in FIG. 4.

FIGS. 8 and 9 are examples of a layout view illustrating the pixel circuit layer PCL shown in FIG. 5. For example, FIG. 8 illustrates a lower conductive layer BML, a first active layer ACT1, a first electrode layer GAT1, a second electrode layer GAT2, a second active layer ACT2, a third electrode layer GAT3, and a first conductive layer SD1. FIG. 9 illustrates a second conductive layer SD2 and a third conductive layer SD3. Components shown in FIGS. 8 and 9 may be equally disposed for each pixel circuit SPC (see FIG. 2). At least some of the components shown in FIGS. 8 and 9 may be connected to each other in pixel circuits SPC (see FIG. 2).

Referring to FIGS. 7 to 9, sub-pixels SP may have a mirror symmetry with respect to a boundary area BA. For example, as shown in FIG. 8, a first sub-pixel SP1 and a second sub-pixel SP2 may be mirror-symmetric to each other, and the second sub-pixel SP2 and a third sub-pixel SP3 may be mirror-symmetric to each other.

First and second shared lines SW1 and SW2 may be disposed in a first boundary area BA1 between sub-pixels SP. Third and fourth shared lines SW3 and SW4 may be disposed in a second boundary area BA2 between the sub-pixels SP.

Each of the first to fourth shared lines SW1 to SW4 may provide the sub-pixels SP with one of pixel control signals SV, GWC2, EM, BCB, GI1 and GI2 and power voltages VDD1, VDD2, and VSS. For example, a line providing a voltage equally (or commonly) provided to the sub-pixels SP instead of a voltage sequentially provided to the sub-pixels SP may be used as a shared line SW.

In these embodiments, voltages provided by the first to fourth shared lines SW1 to SW4 may be a bias gate signal BCB, a second initialization voltage VINT2, a (1-1)th power voltage VDD1, and a (1-2)th power voltage VDD2. However, embodiments are not limited thereto. For example, a voltage provided by each of the first to fourth shared lines SW1 to SW4 may be one of the pixel control signals SV, GWC2, EM, BCB, GI1 and GI2 and the power voltages VDD1, VDD2, and VSS.

The lower conductive layer BML may include first and second lower conductive patterns BML1 and BML2. The first and second lower conductive patterns BML1 and BML2 may be disposed in the same layer, and include the same material.

The lower conductive layer BML may include at least one material among copper (Cu), molybdenum (Mo), tungsten (W), aluminum neodymium (AlNd), titanium (Ti), aluminum (Al), and silver (Ag).

The first active layer ACT1 may include (1-1)th and (1-2)th active patterns ACT1-1 and ACT1-2. The (1-1)th and (1-2)th active patterns ACT1-1 and ACT1-2 may be disposed in the same layer, and include the same material.

The first active layer ACT1 may include any one of various types of semiconductors, e.g., any one of an amorphous silicon semiconductor, a monocrystalline silicon semiconductor, a polycrystalline semiconductor, a low temperature poly-silicon semiconductor, and an oxide semiconductor.

The first electrode layer GAT1 may include (1-1)th to (1-7)th electrode patterns GAT1-1 to GAT1-7. The (1-1)th to (1-7)th electrode patterns GAT1-1 to GAT1-7 may be disposed in the same layer, and include the same material.

The first electrode layer GAT1 may include at least one material among copper (Cu), molybdenum (Mo), tungsten (W), aluminum neodymium (AlNd), titanium (Ti), aluminum (Al), and silver (Ag).

The second electrode layer GAT2 may include (2-1)th to (2-7)th electrode patterns GAT2-1 to GAT2-7. The (2-1)th to (2-7)th electrode patterns GAT2-1 to GAT2-7 may be disposed in the same layer, and include the same material.

The second electrode layer GAT2 may include at least one material among copper (Cu), molybdenum (Mo), tungsten (W), aluminum neodymium (AlNd), titanium (Ti), aluminum (Al), and silver (Ag).

The second active layer ACT2 may include (2-1)th to (2-4)th active patterns ACT2-1 to ACT2-4. The (2-1)th to (2-4)th active patterns ACT2-1 to ACT2-4 may be disposed in the same layer, and include the same material.

The second active layer ACT2 may include any one of various types of semiconductors, e.g., any one of an amorphous silicon semiconductor, a monocrystalline silicon semiconductor, a polycrystalline semiconductor, a low temperature poly-silicon semiconductor, and an oxide semiconductor.

The third electrode layer GAT3 may include (3-1)th to (3-4)th electrode patterns GAT3-1 to GAT3-4. The (3-1)th to (3-4)th electrode patterns GAT3-1 to GAT3-4 may be disposed in the same layer, and include the same material.

The third electrode layer GAT3 may include at least one material among copper (Cu), molybdenum (Mo), tungsten (W), aluminum neodymium (AlNd), titanium (Ti), aluminum (Al), and silver (Ag).

The first conductive layer SD1 may include (1-1)th to (1-15)th conductive patterns SD1-1 to SD1-15. The (1-1)th to (1-15)th conductive patterns SD1-1 to SD1-15 may be disposed in the same layer, and include the same material.

The first conductive layer SD1 may include at least one material among copper (Cu), molybdenum (Mo), tungsten (W), aluminum neodymium (AlNd), titanium (Ti), aluminum (Al), and silver (Ag).

The (1-1)th electrode pattern GAT1-1 and the (2-1)th electrode pattern GAT2-1 may form a first capacitor C1. The (1-4)th electrode pattern GAT1-4 and the (2-2)th electrode pattern GAT2-2 may form a second capacitor C2.

The first lower conductive pattern BML1 may form a back gate electrode of a first transistor T1. The second lower conductive pattern BML2 may form a back gate electrode of a seventh transistor T7.

The (2-3)th electrode pattern GAT2-3 may form a back gate electrode of each of a second transistor T2 and a third transistor T3. The (2-4)th electrode pattern GAT2-4 may form a back gate electrode of the third transistor T3. The (2-5)th electrode pattern GAT2-5 may form a back gate electrode of a sixth transistor T6. The (2-6)th electrode pattern GAT2-6 may form a back gate electrode of each of an eighth transistor T8 and a ninth transistor T9. The (2-7)th electrode pattern GAT2-7 may form a back gate electrode of a twelfth electrode T12.

A portion at which the (1-1)th active pattern ACT1-1 and the (1-1)th electrode pattern GAT1-1 overlap each other may constitute (or form) a portion of the first transistor T1. The (1-1)th active pattern ACT1-1 may be connected to the (1-1)th conductive pattern SD1-1 through a first contact hole CNT1. The (1-1)th conductive pattern SD1-1 may be connected to the (2-2)th active pattern ACT2-2 through a second contact hole CNT2.

A portion at which the (1-1)th active pattern ACT1-1 and the (1-2)th electrode pattern GAT1-2 overlap each other may constitute (or form) a portion of a fourth transistor T4. The (1-2)th electrode pattern GAT1-2 may be connected to the (1-2)th conductive pattern SD1-2 through a first contact hole CNT1. The (1-2)th conductive pattern SD1-2 may receive an emission signal EM. The (1-1)th active pattern ACT1-1 may be connected to (1-3)th conductive pattern SD1-3 through a first contact hole CNT1, and the (1-3)th conductive pattern SD1-3 may be connected to a (2-4)th conductive pattern SD2-4 (see FIG. 9) through a third contact hole CNT3. The (1-3)th conductive pattern SD1-3 may receive the (1-1)th power voltage VDD1 through the (2-4)th conductive pattern SD2-4 (see FIG. 9).

A portion at which the (1-1)th active pattern ACT1-1 and the (1-3)th electrode pattern GAT1-3 may constitute (or form) a portion of a fifth transistor T5. The (1-3)th electrode pattern GAT1-3 may connected to the (1-2)th conductive pattern SD1-2 through a first contact hole CNT1. The (1-2)th conductive pattern SD1-2 may receive the emission signal EM. The (1-1)th active pattern ACT1-1 may be connected to the (1-4)th conductive pattern SD1-4 through a first contact hole CNT1. The (1-4)th conductive pattern SD1-4 may be connected to the (1-4)th electrode pattern GAT1-4 through a first contact hole CNT1, and be connected to the (2-3)th active pattern ACT2-3 through a second contact hole CNT2.

A portion at which (2-1)th active pattern ACT2-1 and the (3-1)th electrode pattern GAT3-1 overlap each other may constitute (or form) a portion of the second transistor T2. A first writing gate signal GWC1 may be applied to the (3-1)th electrode pattern GAT3-1. The (2-1)th active pattern ACT2-1 may be connected to the (1-5)th conductive pattern SD1-5 through a second contact hole CNT2. The (1-5)th conductive pattern SD1-5 may be connected to a (2-5)th conductive pattern SD2-5 (see FIG. 9) through a third contact hole CNT3. The (2-5)th conductive pattern SD2-5 (see FIG. 9) may be connected to a (3-1)th conductive pattern SD3-1 (see FIG. 9) to which a data voltage VDATA (see FIG. 9) through a fourth contact hole (CNT4 see FIG. 9).

A portion at which the (2-2)th active pattern ACT2-2 and the (3-1)th electrode pattern GAT3-1 overlap each other may constitute (or form) a portion of the third transistor T3. The first writing gate signal GWC1 may be applied to the (3-1)th electrode pattern GAT3-1. The (2-2)th active pattern ACT2-2 may be connected to the (1-1)th conductive pattern SD1-1 through a second contact hole CNT2. The (1-1)th conductive pattern SD1-1 may be connected to the (1-1)th active pattern ACT1-1 through a first contact hole CNT1.

A portion at which the (2-3)th active pattern ACT2-3 and the (3-2)th electrode pattern GAT3-2 overlap each other may constitute (or form) a portion of the sixth transistor T6. The (2-3)th active pattern ACT2-3 may be connected to the (1-6)th conductive pattern SD1-6 through a second contact hole CNT2. A first initialization voltage VINT1 may be applied to the (1-6)th conductive pattern SD1-6. The (2-3)th active pattern ACT2-3 may be connected to the (1-7)th conductive pattern SD1-7 through a second contact hole CNT2. The (1-7)th conductive pattern SD1-7 may be connected to the (1-1)th active pattern ACT1-1 through a first contact hole CNT1.

A portion at which the (1-2)th active pattern ACT1-2 and the (1-4)th electrode pattern GAT1-4 overlap each other may constitute (or form) a portion of the seventh transistor T7. The (1-2)th active pattern ACT1-2 may be connected to the (1-4)th conductive pattern SD1-4 through a first contact hole CNT1. The (1-2)th active pattern ACT1-2 may be connected to the (1-8)th conductive pattern SD1-8 through a first contact hole CNT1. The (1-8)th conductive pattern SD1-8 may be connected to the (2-3)th active pattern ACT2-3 through a second contact hole CNT2. The (1-2)th active pattern ACT1-2 may be connected to the (1-9)th conductive pattern SD1-9 through a first contact hole CNT1. The (1-9)th conductive pattern SD1-9 may be connected to the (2-4)th active pattern ACT2-4 through a second contact hole CNT2.

A portion at which the (1-2)th active pattern ACT1-2 and the (1-5)th electrode pattern GAT1-5 overlap each other constitute (or form) a portion of a tenth transistor T10. The (1-5)th electrode pattern GAT1-5 may be connected to the (1-10)th conductive pattern SD1-10 through a first contact hole CNT1. The (1-5)th conductive pattern SD1-5 may receive the emission signal EM. The (1-2)th active pattern ACT1-2 may be connected to the (1-11)th conductive pattern SD1-11 through a first contact hole CNT1, and the (1-11)th conductive pattern SD1-11 may be connected to the (2-4)th conductive pattern SD2-4 (see FIG. 9) through a third contact hole CNT3. The (1-11)th conductive pattern SD1-11 may receive the (1-2)th power voltage VDD2 through the (2-4)th conductive pattern SD2-4.

A portion at which the (1-2)th active pattern ACT1-2 and the (1-6)th conductive pattern GAT1-6 overlap each other may constitute (or form) a portion of an eleventh transistor T11. The (1-6)th electrode pattern GAT1-6 may be connected to the (1-10)th conductive pattern SD1-10 through a first contact hole CNT1. The (1-10)th conductive pattern SD1-10 may receive the emission signal EM. The (1-2)th active pattern ACT1-1 may be connected to the (1-11)th conductive pattern SD1-11 through a first contact hole CNT1. The (1-8)th conductive pattern SD1-8 may be connected to the (2-3)th active pattern ACT2-3 through a second contact hole CNT2. The (1-2)th active pattern ACT1-2 may be connected to the (1-12)th conductive pattern SD1-12 through a first contact hole CNT1. The (1-12)th conductive pattern SD1-12 may be connected to a (2-7)th conductive pattern SD2-7 (see FIG. 9) through a third contact hole CNT3. The (2-7)th conductive pattern SD2-7 (see FIG. 9) may be connected to a (3-3)th conductive pattern SD3-3 (see FIG. 9) through a fourth contact hole CNT4 (see FIG. 9).

A portion at which the (1-2)th active pattern ACT1-2 and the (1-7)th electrode pattern GAT1-7 overlap each other may constitute (or form) a portion of a thirteenth transistor T13. The (1-7)th electrode pattern GAT1-7 may be connected to the (1-13)th conductive pattern SD1-13 through a first contact hole CNT1. The (1-13)th conductive pattern SD1-13 may be connected to a (2-1)th conductive pattern SD2-1 (see FIG. 9) through a third contact hole CNT3. The (2-1)th conductive pattern SD2-1 (see FIG. 9) may receive the bias gate signal BCB. The (1-2)th active pattern ACT1-2 may be connected to the (1-12)th conductive pattern SD1-12. The (1-12)th conductive pattern SD1-12 may be connected to the (2-7)th conductive pattern SD2-7 (see FIG. 9) through a third contact hole CNT3. The (1-2)th active pattern ACT1-2 may be connected to the (1-14)th conductive pattern SD1-14 through a first contact hole CNT1. The (1-14)th conductive pattern SD1-14 may be connected to a (2-2)th conductive pattern (see FIG. 9) through a third contact hole CNT3. The second initialization voltage VINT2 may be applied to the (2-2)th conductive pattern SD2-2.

A portion at which the (2-4)th active pattern ACT2-4 and the (3-3)th electrode pattern GAT3-3 overlap each other may constitute (or form) a portion of the eighth transistor T8. A second writing gate signal GWC2 may be applied to the (3-3)th electrode pattern GAT3-3. The (2-4)th active pattern ACT2-4 may be connected to the (1-15)th conductive pattern SD1-15 through a second contact hole CNT2. The (1-15)th conductive pattern SD1-15 may be connected to a (2-6)th conductive pattern SD2-6 (see FIG. 9) through a third contact hole CNT3. The (2-6)th conductive pattern SD2-6 (see FIG. 9) may be connected to the (3-1)th conductive pattern SD3-1 (see FIG. 9) to which the data voltage VDATA (see FIG. 9) is applied through a fourth contact hole CNT4 (see FIG. 9).

A portion at which the (2-3)th active pattern ACT2-3 and the (3-3)th electrode pattern GAT3-3 overlap each other may constitute (or form) a portion of the ninth transistor T9. The second writing gate signal GWC2 may be applied to the (3-3)th electrode pattern GAT3-3. The (2-3)th active pattern ACT2-3 may be connected to the (1-8)th conductive pattern SD1-8 through a second contact hole CNT2. The (1-8)th conductive pattern SD1-8 may be connected to the (1-2)th active pattern ACT1-2 through a first contact hole CNT1.

A portion at which the (2-3)th active pattern ACT2-3 and the (3-4)th electrode pattern GAT3-4 overlap each other may constitute (or form) a portion of the twelfth transistor T12. The (2-3)th active pattern ACT2-3 may be connected to the (1-6)th conductive pattern SD1-6 through a second contact hole CNT2. The first initialization voltage VINT1 may be applied to the (1-6)th conductive pattern SD1-6. The (2-3)th active pattern ACT2-3 may be connected to the (1-9)th conductive pattern SD1-9 through a second contact hole CNT2. The (1-9)th conductive pattern SD1-9 may be connected to the (1-2)th active pattern ACT1-2 through a first contact hole CNT1.

Referring to FIGS. 8 to 9, the second conductive layer SD2 may include (2-1)th to (2-7)th conductive patterns SD2-1 to SD2-7. The (2-1)th to (2-7)th conductive patterns SD2-1 to SD2-7 may be disposed in the same layer, and include the same material.

The (2-1)th to (2-7)th conductive patterns SD2-1 to SD2-7 may include at least one material among copper (Cu), molybdenum (Mo), tungsten (W), aluminum neodymium (AlNd), titanium (Ti), aluminum (Al), and silver (Ag).

The third conductive layer SD3 may include (3-1)th to (3-3)th conductive patterns SD3-1 to SD3-3. The (3-1)th to (3-3)th conductive patterns SD3-1 to SD3-3 may be disposed in the same layer, and include the same material.

The (3-1)th to (3-3)th conductive patterns SD3-1 to SD3-3 may include at least one material among copper (Cu), molybdenum (Mo), tungsten (W), aluminum neodymium (AlNd), titanium (Ti), aluminum (Al), and silver (Ag).

The boundary area BA may include the first boundary area BA1 and the second boundary area BA2. The first boundary area BA1 and the second boundary area BA2 may be alternately disposed in the first direction DR1.

A shared line (e.g., the first and second shared lines SW1 and SW2) disposed in the first boundary area BA1 and a shared line (e.g., the third and fourth shared lines SW3 and SW4) disposed in the second boundary area BA2 may be different from each other. Since the shared line SW is disposed in the boundary area BA to provide a voltage to sub-pixels SP at sides (e.g., opposite sides) thereof, each shared line SW may provide a voltage to all sub-pixels SP although two boundary areas BA1 and BA2 are alternately disposed.

The (2-1)th conductive pattern SD2-1 may form the first shared line SW1. The (2-1)th conductive pattern SD2-1 may be disposed in the first boundary area BA1, and be connected to the (1-13)th conductive pattern SD1-13 through a third contact hole CNT3. The (1-13)th conductive pattern SD1-13 may be connected to the (1-7)th electrode pattern GAT1-7 through a first contact hole CNT1. Due to a mirror symmetry, the (1-7)th electrode pattern GAT1-7 may provide the bias gate signal BCB to thirteenth transistors T13 of two adjacent sub-pixels SP.

The (2-2)th conductive pattern SD2-2 may form the second shared line SW2. The (2-2)th conductive pattern SD2-2 may be disposed in the first boundary area BA1, and be connected to the (1-14)th conductive pattern SD1-14 through a third contact hole CNT3. The (1-14)th conductive pattern SD1-14 may be connected to the (1-2)th active pattern ACT1-2. Due to a mirror symmetry, the (1-14)th conductive pattern SD1-14 may provide the second initialization voltage VINT2 to thirteenth transistors T13 of two adjacent sub-pixels SP.

The (2-1)th and (2-2)th conductive patterns SD2-1 and SD2-2 may extend in the second direction DR2. For example, the third contact hole CNT3 connected to the (2-1)th conductive pattern SD2-1 and the third contact hole CNT3 connected to the (2-2)th conductive pattern SD2-2 may be arranged in the second direction DR2.

For example, the (2-1)th conductive pattern SD2-1 may include an extension portion extending in the second direction DR2 and a protrusion portion protruding in the first direction DR1. For example, the protrusion portion may be connected to the third contact hole CNT3.

For example, the (2-2)th conductive pattern SD2-2 may include an extension portion extending in the second direction DR2 and a protrusion portion protruding in the opposite direction of the first direction DR1. For example, the protrusion portion may be connected to the third contact hole CNT3.

The (2-3)th conductive pattern SD2-3 may form the third shared line SW3. The third shared line SW3 may receive the (1-1)th power voltage VDD1. The (2-3)th conductive pattern SD2-3 may be disposed in the second boundary area BA2, and be connected to the (1-3)th conductive pattern SD1-3 through a third contact hole CNT3. The (1-3)th conductive pattern SD1-3 may be connected to the (1-1)th active pattern ACT1-1 through a first contact hole CNT1. Due to a mirror symmetry, the (1-3)th conductive pattern SD1-3 may provide the (1-1)th power voltage VDD1 to fourth transistors T4 of two adjacent sub-pixels SP.

The (2-4)th conductive pattern SD2-4 may form the fourth shared line SW4. The fourth shared line SW4 may receive the (1-2)th power voltage VDD2. The (2-4)th conductive pattern SD2-4 may be disposed in the second boundary area BA2, and be connected to the (1-11)th conductive pattern SD1-11 through a third contact hole CNT3. The (1-11)th conductive pattern SD1-11 may be connected to the (1-2)th active patterns ACT1-2. Due to a mirror symmetry, the (1-11)th conductive pattern SD1-11 may provide the (1-2)th power voltage VDD2 to tenth transistors T10 of two adjacent sub-pixels SP.

The (2-3)th and (2-4)th conductive patterns SD2-3 and SD2-4 may extend in the second direction DR2. For example, the third contact hole CNT3 connected to the (2-3)th conductive pattern SD2-3 and the third contact hole CNT3 connected to the (2-4)th conductive pattern SD2-4 may be arranged in the second direction DR2.

For example, the (2-3)th conductive pattern SD2-3 may include an extension portion extending in the second direction DR2 and a protrusion portion protruding in the first direction DR1. For example, the protrusion portion may be connected to the third contact hole CNT3.

For example, the (2-4)th conductive pattern SD2-3 may include an extension portion extending in the second direction DR2 and a protrusion portion protruding in the opposite direction of the first direction DR1. For example, the protrusion portion may be connected to the third contact hole CNT3.

As such, contact holes (e.g., third contact holes CNT3) connected to shared lines SW in the same boundary area BA1 or BA2 are arranged while being intersect each other in an extension direction, so that shared lines SW may be arranged in one boundary area BA.

The (3-1)th conductive pattern SD3-1 may include the data lines DL1 to DLn (see FIG. 1) to which the data voltage VDATA is applied. The (3-1)th conductive pattern SD3-1 may be connected to the (2-5)th and (2-6)th conductive patterns SD2-5 and SD2-6 through fourth contact holes CNT4.

The second power voltage VSS may be applied to the (3-2)th conductive pattern SD3-2. The (3-2)th conductive pattern SD3-2 may be connected to the light emitting element LD (see FIG. 7).

The (2-7)th conductive pattern SD2-7 may be connected to the (1-12) conductive pattern SD1-12 through a third contact hole CNT3. The (2-7)th conductive pattern SD2-7 may be connected to the (3-3)th conductive pattern SD3-3 through a fourth contact hole CNT4. The (3-3)th conductive pattern SD3-3 may form first to third anode electrodes AE1 to AE3 of each of the first to third light emitting elements LD1 to LD3 (see FIG. 7).

In these embodiments, it is illustrated that the first to fourth shared lines SW1 to SW4 are disposed in the second conductive layer SD2. However, embodiments are not limited thereto.

Figure 10:
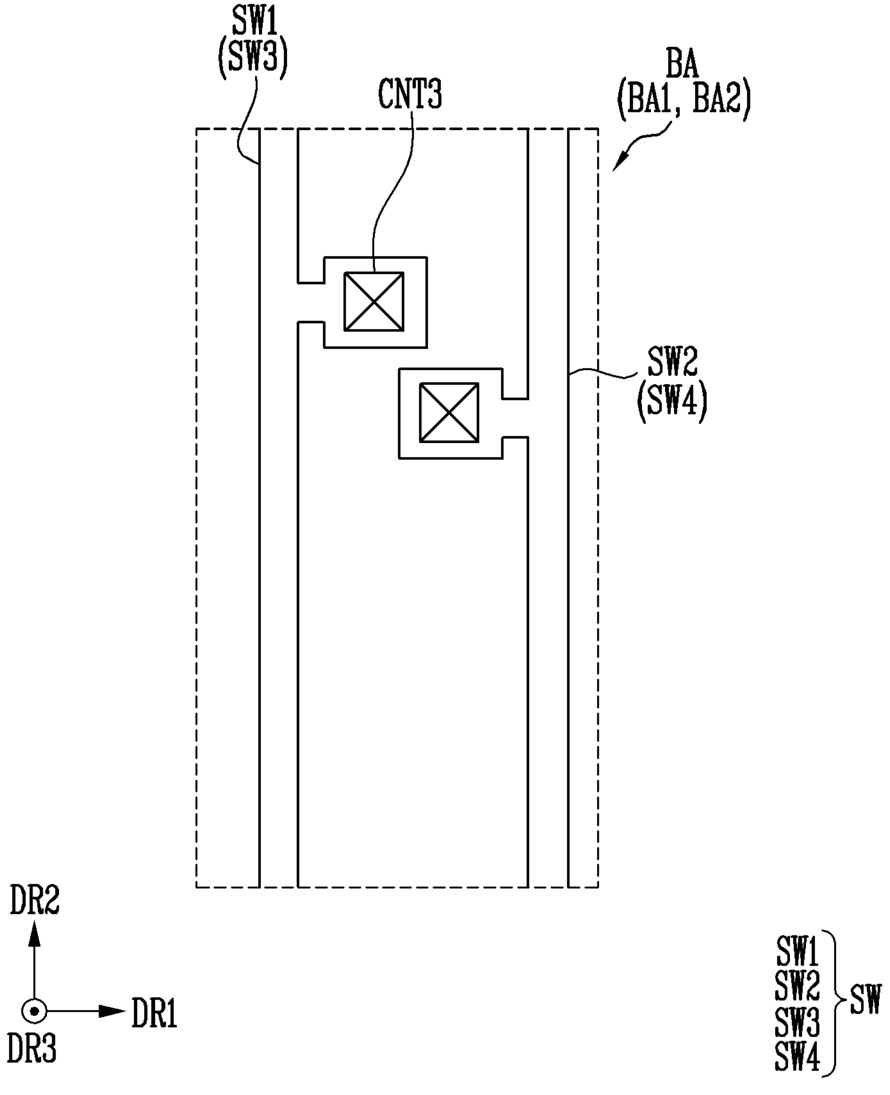
FIG. 10 is a layout view illustrating a shared line of a display device in accordance with embodiments.

FIG. 10 is a layout view illustrating a shared line of a display device in accordance with embodiments.

The display device in accordance with these embodiments is configured substantially identical to the display device described with reference to FIGS. 1 to 9, except the disposition of a third contact hole CNT3 connected to a shared line SW. Therefore, components identical or similar to those of device described with reference to FIGS. 1 to 9 are designated by like reference numerals, and redundant descriptions will be omitted for descriptive convenience.

Referring to FIG. 10, third contact holes CNT3 connected to the shared line SW are not necessarily arranged on a straight line in the second direction DR2. For example, a third contact hole CNT3 connected to a first shared line SW1 and a third contact hole CNT3 connected to a second shared line SW2 may not be arranged on a straight line in the second direction DR2. For example, a third contact hole CNT3 connected to a third shared line SW3 and a third contact hole CNT3 connected to a fourth shared line SW4 may not be arranged on a straight line in the second direction DR2.

Figure 11:
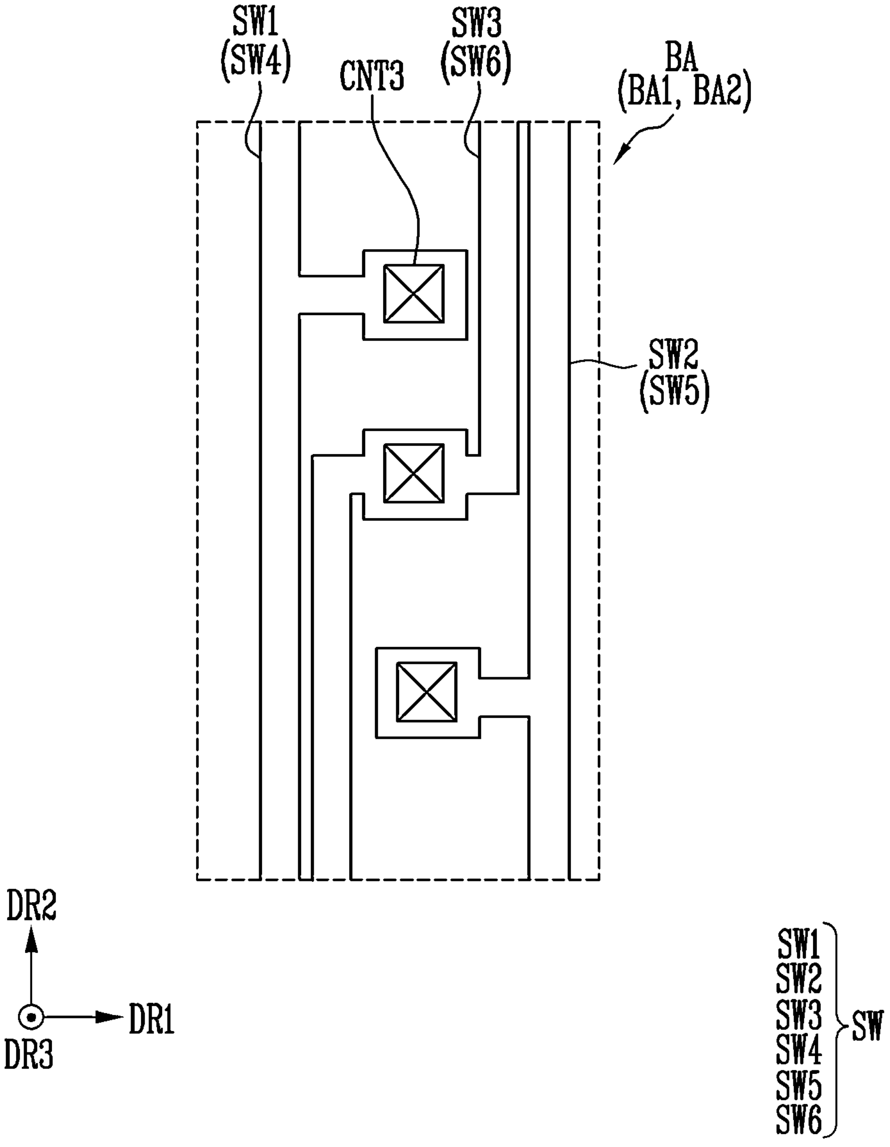
FIG. 11 is a layout view illustrating a shared line of a display device in accordance with embodiments.

FIG. 11 is a layout view illustrating a shared line of a display device in accordance with embodiments.

The display device in accordance with these embodiments is configured substantially identical to the display device described with reference to FIGS. 1 to 9, except three shared lines SW are disposed in a boundary area (or single boundary area) BA. Therefore, components identical or similar to those of device described with reference to FIGS. 1 to 9 are designated by like reference numerals, and redundant descriptions will be omitted for descriptive convenience.

Referring to FIG. 10, first to third shared lines SW1 to SW3 may be disposed in a first boundary area BA1. Fourth to sixth shared lines SW4 to SW6 may be disposed in a second boundary area BA2.

The first to sixth shared lines SW1 to SW6 may extend in the second direction DR2. Third contact holes CNT3 respectively connected to the first to third shared lines SW1 to SW3 may be arranged in the second direction DR2. Third contact holes CNT3 respectively connected to the fourth to sixth shared lines SW4 to SW6 may be arranged in the second direction DR2.

Each of the first to sixth shared lines SW1 to SW6 may provide the sub-pixels SP (see FIG. 7) with one of the pixel control signals SV, GWC2, EM, BCB, GI1, and GI2 (see FIG. 3) and the power voltages VDD1, VDD2, and VSS (see FIG. 3). For example, a line which provides a voltage equally (or commonly) provided to the sub-pixels SP (see FIG. 7) instead of a voltage sequentially provided to the sub-pixels SP may be used as a shared line SW.

For example, each of the first and fourth shared lines SW1 and SW4 may include an extension portion extending in the second direction DR2 and a protrusion portion protruding in the first direction DR1. For example, the protrusion portion may be connected to a third contact hole CNT3.

For example, each of the second and fifth shared lines SW2 and SW5 may include an extension portion extending in the second direction DR2 and a protrusion portion protruding in the opposite direction of the first direction DR1. For example, the protrusion portion may be connected to a third contact hole CNT3.

For example, each of the third and sixth shared lines SW2 and SW5 may include a connection portion connected to a third contact hole CNT3, a first extension portion which is connected to the connection portion in the first direction DR1 and extends in the second direction DR2, and a second extension portion which is connected to the connection portion in the opposite direction of the first direction DR1 and extends in the second direction DR2.

In these embodiments, three shared lines SW may be disposed in one boundary area BA. However, the number of shared lines SW disposed in one boundary area BA may be greater than 3.

Figure 12:
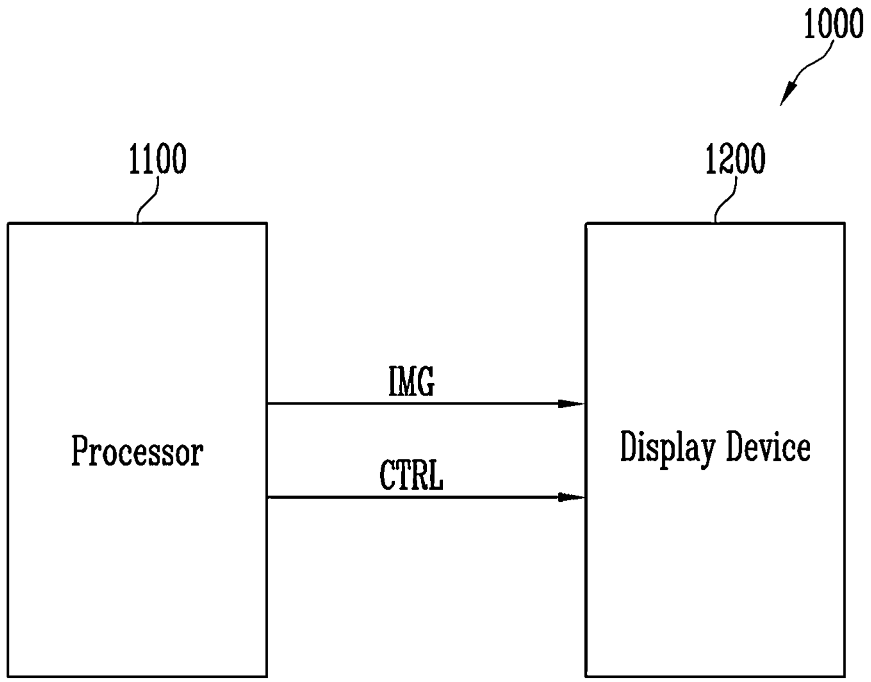
FIG. 12 is a schematic block diagram illustrating an embodiment of a display system.

FIG. 12 is a schematic block diagram illustrating an embodiment of a display system 1000.

Referring to FIG. 12, a display system 1000 may include a processor 1100 and a display device 1200.

The processor 1100 may perform various tasks and various calculations. In embodiments, the processor 1100 may include an Application Processor (AP), a Graphics Processing Unit (GPU), a microprocessor, a Central Processing Unit (CPU), and the like. The processor 1100 may be connected to other components of the display system 1000 through a bus system to control the components of the display system 1000.

The processor 1100 may transmit image data IMG and a control signal CTRL to the display device 1200. The display device 1200 may display an image, based on the image data IMG and the control signal CTRL. The display device 1200 may be configured identical to the display device DD described with reference to FIG. 1. The image data IMG and the control signal CTRL may be provided as the image data IMG and the control signal CTRL, which are shown in FIG. 1, respectively.

The display system 1000 may include a computing system for providing an image display function, such as a smart watch, a mobile phone, a smartphone, a portable computer, a tablet personal computer (PC), a watch phone, an automotive display, a smart glass, a portable multimedia player (PMP), a navigation system, or an ultra mobile computer (UMPC). The display system 1000 may include at least one of a head mounted display (HMD) device, a virtual reality (VR) device, a mixed reality (MR) device, and an augmented reality (AR) device.

FIGS. 13 to 16 are schematic perspective views illustrating application examples of the display system shown in FIG. 12.

Figure 13:
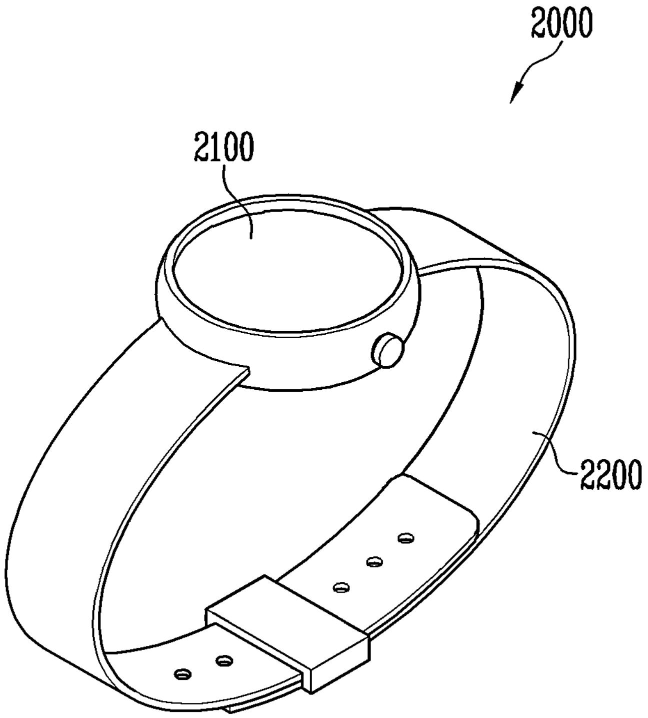
FIGS. 13 to 16 are schematic perspective views illustrating application examples of the display system shown in FIG. 12.

Referring to FIG. 13, the display system 1000 shown in FIG. 12 may be applied to a smart watch 2000 including a display part 2100 and a strap part 2200.

The smart watch 2000 may be a wearable electronic device. For example, the smart watch 2000 may have a structure in which the strap part 2200 is mounted on a wrist of a user. The display system 1000 and/or the display device 1200 may be applied to the display part 2100, so that image data including time information may be provided to the user.

Figure 14:
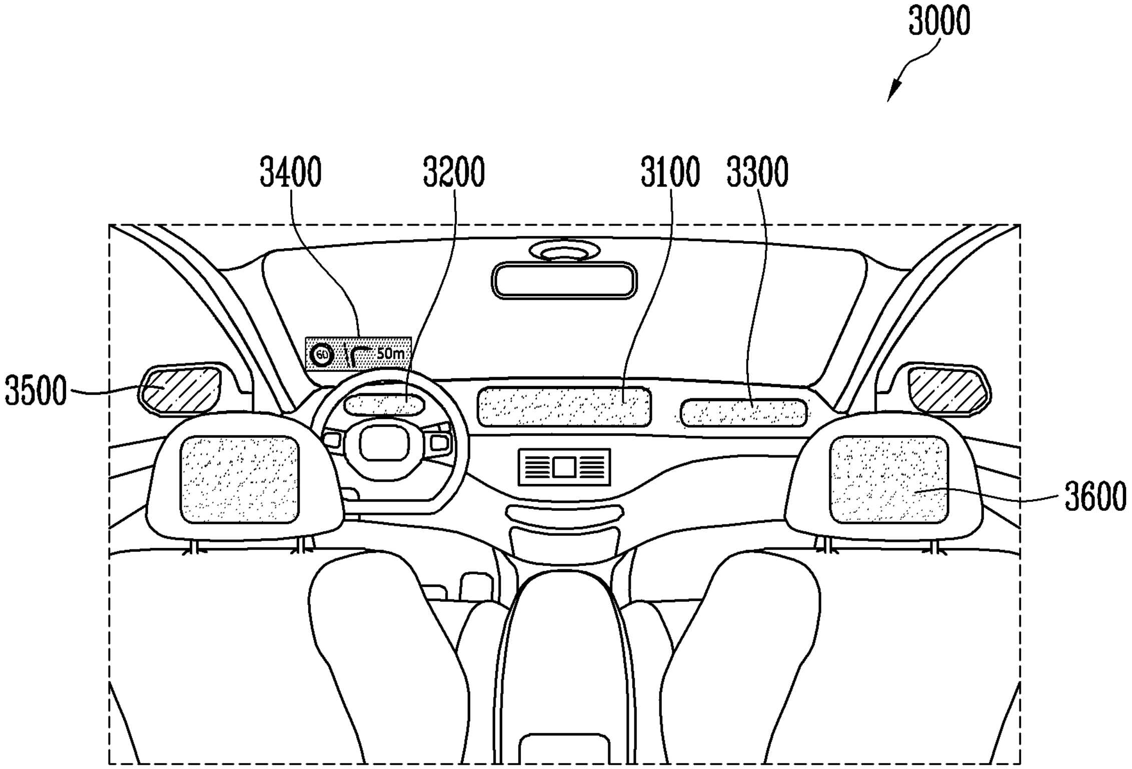

Referring to FIG. 14, the display system 1000 shown in FIG. 12 may be applied to an automotive display system 3000. The automotive display system 3000 may include a computing system provided at the inside/outside of a vehicle to provide image data.

For example, the display system 1000 and/or the display device 1200 may be applied to at least one of an infotainment panel 3100, a cluster 3200, a co-driver display 3300, a head-up display 3400, a side mirror display 3500, and a read seat display 3600, which are provided in the vehicle.

Figure 15:
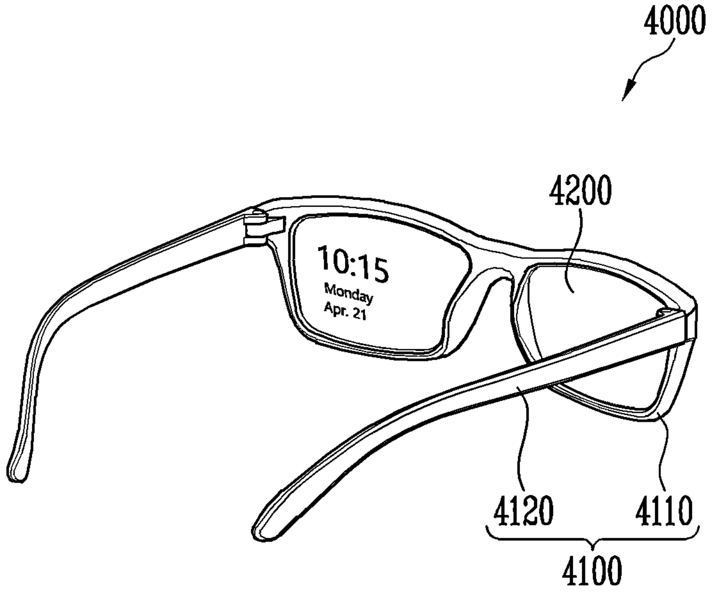

Referring to FIG. 15, the display system 1000 shown in FIG. 12 may be applied to smart glasses 4000. The smart glasses 4000 are a wearable electronic device which is worn on the face of a user. For example, the smart glasses 4000 may be a wearable device for Augmented Reality (AR).

The smart glasses 4000 may include a frame 4100 and a lens part 4200. The frame 4100 may include a housing 4110 supporting the lens part 4200 and a leg part 4120 for allowing the user to wear the smart glasses 4000. The leg part 4120 may be connected to the housing 4110 through a hinge, to be folded or unfolded with respect to the housing 4110.

A battery, a touch pad, a microphone, a camera, and the like may be built in the frame 4100. For example, a projector for outputting light, a processor for controlling a light signal, and the like may be built in the frame 4100.

The lens part 4200 may be an optical member which transmits light therethrough or reflects light thereby. For example, the lens part 4200 may include glass, transparent synthetic resin, and the like.

In order to enable eyes of the user to recognize visual information, the lens part 4200 may allow an image caused by a light signal transmitted from the projector of the frame 4100 to be reflected by a rear surface (e.g., a surface in a direction facing the eyes of the user) of the lens part 4200. For example, the user may recognize information including time, data, and the like, which are displayed on the lens part 4200. The projector and/or the lens part 4200 may be a kind of display device. The display device 1200 may be applied to the projector and/or the lens part 4200.

Figure 16:
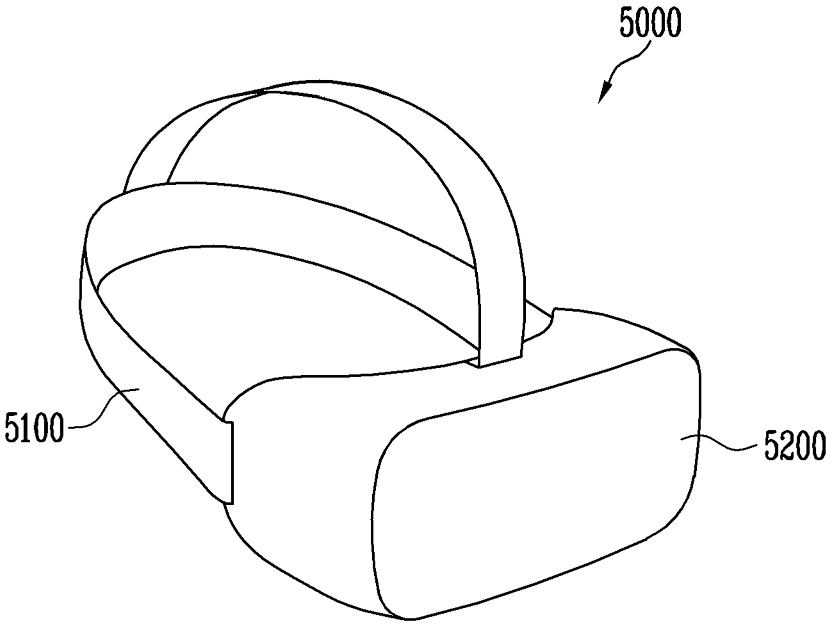

Referring to FIG. 16, the display system 1000 shown in FIG. 12 may be applied to a head mounted display device 5000.

The head mounted display device 5000 may be a wearable electronic device which is worn on the head of a user. For example, the head mounted display device 5000 may be a wearable device for virtual reality (VR) or mixed reality (MR).

The head mounted display device 5000 may include a head mounted band 5100 and a display accommodating case 5200. The head mounted band 5100 may be connected to the display accommodating case 5200. The head mounted band 5100 may include a horizontal band and/or a vertical band, used to fix the head mounted display device 5000 to the head of the user. The horizontal band may surround a side portion of the head of the user, and the vertical band may surround an upper portion of the head of the user. However, embodiments are not limited thereto. For example, the head mounted band 5100 may be implemented in the form of a glasses frame, a helmet or the like.

The display accommodating case 5200 may accommodate the display system 1000 and/or the display device 1200.

The disclosure may be applied to display devices and electronic devices including the same. For example, the disclosure may be applied to digital TVs, 3D TVs, mobile phones, smart phones, tablet computers, VR devices, PCs, home appliances, notebook computers, PDAs, PMPs, digital cameras, music players, portable game consoles, navigation systems, and the like.

In the display panel DP in accordance with embodiments, a line may be disposed in a boundary area, so that adjacent sub-pixels SP may share the line. Accordingly, a high pixels per inch (ppi) may be ensured or guaranteed, and the area of a capacitor is guaranteed, so that mura may be reduced or prevented. Further, the line width of a power line increases, thereby reducing or preventing an IR drop. Furthermore, a design rule is set by a wide margin, so that a yield may be improved.

In concluding the detailed description, those skilled in the art will appreciate that many variations and modifications may be made to the embodiments without substantially departing from the principles and spirit and scope of the disclosure. Therefore, the disclosed embodiments are used in a generic and descriptive sense only and not for purposes of limitation.

What is claimed is:

1. A display device comprising:
- a substrate;
- a plurality of sub-pixels disposed on the substrate;
- a first shared line disposed in a boundary area between adjacent sub-pixels of the plurality of sub-pixels, the first shared line provides a first voltage to the sub-pixels on opposite sides of the boundary area; and
- a second shared line disposed in the boundary area, the second shared line provides a second voltage different from the first voltage to the sub-pixels on opposite sides of the boundary area,
- wherein at least one of the first voltage and the second voltage is one of a sweep voltage, an emission signal, a first initialization gate signal, a first power voltage, and a first initialization voltage.

2. The display device of claim 1, wherein at least one of the first voltage and the second voltage is commonly provided to the sub-pixels.

3. The display device of claim 1, wherein each of the sub-pixels includes:
- a light emitting element;
- a first sub-pixel circuit that controls an emission time of the light emitting element; and
- a second sub-pixel circuit that provides a driving current to the light emitting element.

4. The display device of claim 3, wherein the first sub-pixel circuit includes:

a first transistor including a control electrode connected to a first node, a first electrode connected to a second node, and a second electrode connected to a third node;

a first capacitor including a first electrode that receives a sweep voltage and a second electrode connected to the first node;

a second transistor including a control electrode that receives a first writing gate signal, a first electrode that receives a data voltage, and a second electrode connected to the second node;

a third transistor including a control electrode that receives the first writing gate signal, a first electrode connected to the third node, and a second electrode connected to the first node;

a fourth transistor including a control electrode that receives an emission signal, a first electrode that receives the first power voltage, and a second electrode connected to the second node;

a fifth transistor including a control electrode that receives the emission signal, a first electrode connected to the third node, and a second electrode connected to the second sub-pixel circuit; and a sixth transistor including a control electrode that receives a first initialization gate signal, a first electrode that receives the first initialization voltage, and a second electrode connected to the first node.

5. The display device of claim 3, wherein the second sub-pixel circuit includes:

a seventh transistor including a control electrode connected to a fourth node connected to the first sub-pixel circuit, a first electrode connected to a fifth node, and a second electrode connected to a sixth node;

a second capacitor including a first electrode that receives a second power voltage and a second electrode connected to the fourth node;

an eighth transistor including a control electrode that receives a second writing gate signal, a first electrode that receives a data voltage, and a second electrode connected to the fifth node;

a ninth transistor including a control electrode that receives the second writing gate signal, a first electrode connected to the sixth node, and a second electrode connected to the fourth node;

a tenth transistor including a control electrode that receives an emission signal, a first electrode that receives the second power voltage, and a second electrode connected to the fifth node;

an eleventh transistor including a control electrode that receives the emission signal, a first electrode connected to the sixth node, and a second electrode connected to the light emitting element;

a twelfth transistor including a control electrode that receives a second initialization gate signal, a first electrode that receives the first initialization voltage, and a second electrode connected to the fourth node; and a thirteenth transistor including a control electrode that receives a bias gate signal, a first electrode that receives a second initialization voltage, and a second electrode connected to the light emitting element.

6. The display device of claim 5, wherein at least one of the first voltage and the second voltage is one of the second writing gate signal, the emission signal, the bias gate signal, the second initialization gate signal, the second power voltage, the first initialization voltage, and the second initialization voltage.

7. The display device of claim 3, wherein the light emitting element includes a first electrode connected to the second sub-pixel circuit and a second electrode that receives a second power voltage, and one of the first voltage and the second voltage is the second power voltage.

8. The display device of claim 1, further comprising:

a third shared line disposed in the boundary area, the third shared line that provides a third voltage different from the first voltage and the second voltage to the sub-pixels adjacent to the boundary area.

9. The display device of claim 8, wherein the first shared line, the second shared line, and the third shared line are formed as a same conductive layer, the same conductive layer includes:

a first conductive pattern forming the first shared line, the first conductive pattern extending in a first direction;

a second conductive pattern forming the second shared line, the second conductive pattern extending in the first direction; and a third conductive pattern forming the third shared line, the third conductive pattern extending in the first direction, and a contact hole connected to the first conductive pattern, a contact hole connected to the second conductive pattern, and a contact hole connected to the third conductive pattern are arranged in the first direction.

10. The display device of claim 9, wherein the first conductive pattern includes an extension portion extending in the first direction and a connection portion protruding in a second direction intersecting the first direction to be connected to the contact hole connected to the first conductive pattern, the second conductive pattern includes an extension portion extending in the first direction and a connection portion protruding in the opposite direction of the second direction intersecting the first direction to be connected to the contact hole connected to the second conductive pattern, and the third conductive pattern includes a connection portion connected to the contact hole connected to the third conductive pattern, a first extension portion which is connected to the connection portion in the second direction intersecting the first direction and extends in the first direction, and a second extension portion which is connected to the connection portion in the opposite direction of the second direction intersecting the first direction and extends in the first direction.

11. The display device of claim 1, wherein the boundary area includes a first boundary area and a second boundary area, the first shared line is disposed in the first boundary area, and provides the first voltage to the sub-pixels adjacent to the first boundary area, the second shared line is disposed in the second boundary area, and provides the second voltage to the sub-pixels adjacent to the first boundary area, and the display device further comprises:

a third shared line disposed in the second boundary area, the third shared line that provides a third voltage different from the first voltage and the second voltage to the sub-pixels adjacent to the second boundary area; and a fourth shared line disposed in the second boundary area, the fourth shared line that provides a fourth voltage different from the first voltage, the second voltage, and the third voltage to the sub-pixels adjacent to the second boundary area.

12. The display device of claim 11, wherein the first, second, third, and fourth shared lines extend in a first direction, and the first boundary area and the second boundary area are alternately disposed in a second direction intersecting the first direction.

13. The display device of claim 1, wherein the sub-pixels have a mirror symmetry with respect to the boundary area.

14. A display device comprising:

a substrate;

a plurality of sub-pixels disposed on the substrate;

a first shared line disposed in a boundary area between at least two adjacent sub-pixels of the plurality of sub-pixels, the first shared line provides a first voltage to the at least two adjacent sub-pixels; and a second shared line disposed in the boundary area, the second shared line provides a second voltage different from the first voltage to the at least two adjacent sub-pixels, wherein the first shared line and the second shared line are formed as a same conductive layer, the same conductive layer includes:

a first conductive pattern forming the first shared line, the first conductive pattern extending in a first direction; and a second conductive pattern forming the second shared line, the second conductive pattern extending in the first direction, and a contact hole connected to the first conductive pattern and a contact hole connected to the second conductive pattern are arranged in the first direction.

15. The display device of claim 14, wherein the first conductive pattern includes an extension portion extending in the first direction and a connection portion protruding in a second direction intersecting the first direction to be connected to the contact hole connected to the first conductive pattern, and the second conductive pattern includes an extension portion extending in the first direction and a connection portion protruding in the opposite direction of the second direction intersecting the first direction to be connected to the contact hole connected to the second conductive pattern.

16. A display system comprising:

a substrate;

a plurality of sub-pixels disposed on the substrate;

a first shared line disposed in a boundary area between at least two adjacent sub-pixels of the plurality of sub-pixels, the first shared line being electrically connected to the sub-pixels on opposite sides of the boundary area; and a second shared line disposed in the boundary area, the second shared line being spaced apart from the first shared line, the second shared line being electrically connected to the sub-pixels on opposite sides of the boundary area, wherein at least one of the first voltage and the second voltage is one of a sweep voltage, an emission signal, a first initialization gate signal, a first power voltage, and a first initialization voltage.

17. The display system of claim 16, wherein the first shared line and the second shared line are formed as a same conductive layer, the same conductive layer includes:

a first conductive pattern forming the first shared line, the first conductive pattern extending in a first direction; and a second conductive pattern forming the second shared line, the second conductive pattern extending the first direction, and a contact hole connected to the first conductive pattern and a contact hole connected to the second conductive pattern are arranged in the first direction.

18. The display system of claim 17, wherein the first conductive pattern includes an extension portion extending in the first direction and a connection portion protruding in a second direction intersecting the first direction to be connected to the contact hole connected to the first conductive pattern, and the second conductive pattern includes an extension portion extending in the first direction and a connection portion protruding in the opposite direction of the second direction intersecting the first direction to be connected to the contact hole connected to the second conductive pattern.

19. The display system of claim 16, further comprising:

a third shared line disposed in the boundary area, the third shared line being spaced apart from the first and second shared lines, the third shared line being electrically connected to the sub-pixels adjacent to the boundary area.

* * * * *